United States Patent
Sakuma et al.

[11] Patent Number: 5,233,454
[45] Date of Patent: Aug. 3, 1993

[54] IMAGE FORMING REFLECTING MIRROR FOR CONSTANT SPEED OPTICAL SCAN AND OPTICAL SCANNER

[75] Inventors: Nobuo Sakuma, Inagi; Hiromichi Atsuumi, Yokohama; Osamu Endou, Kawasaki, all of Japan

[73] Assignee: Ricoh Company, Ltd., Tokyo, Japan

[21] Appl. No.: 842,713

[22] Filed: Feb. 27, 1992

[30] Foreign Application Priority Data

Feb. 28, 1991 [JP] Japan ............................ 3-59649
Aug. 5, 1991 [JP] Japan ............................ 3-195418

[51] Int. Cl.$^5$ ............................................. G02B 26/08
[52] U.S. Cl. .................................... 359/196; 359/218; 359/221; 359/869
[58] Field of Search ............. 359/208, 196, 213, 214, 359/215, 216, 217, 218, 219, 221, 868, 869; 250/235, 236

[56] References Cited

U.S. PATENT DOCUMENTS

| | | | |
|---|---|---|---|
| 4,756,585 | 7/1988 | Kaneko et al. ............... | 359/218 |
| 4,852,957 | 8/1989 | Wakimoto et al. ........... | 359/221 |
| 4,941,719 | 7/1990 | Hisada et al. ................ | 359/217 |
| 4,955,682 | 9/1990 | Yamaguchi et al. .......... | 359/216 |
| 4,984,858 | 1/1991 | Kuroda ........................ | 359/218 |
| 5,005,928 | 4/1991 | Suzuki et al. ................ | 359/196 |
| 5,157,534 | 10/1992 | Endou et al. ................. | 359/212 |
| 5,170,278 | 12/1992 | Wada et al. .................. | 359/212 |

FOREIGN PATENT DOCUMENTS 0351011 1/1990 European Pat. Off. .

*Primary Examiner*—Loha Ben
*Attorney, Agent, or Firm*—Oblon, Spivak, McClelland, Maier & Neustadt

[57] ABSTRACT

In an image forming reflecting mirror for a constant speed optical scan, a light beam is convergent in a cross scan-corresponding direction with a point near a starting point of deflection as a starting point of the light beam, and the light beam is deflected at an equal angular velocity and is converged to form a light spot on a scanned face so as to optically scan the scanned face at a constant speed. The image forming reflecting mirror has a shape on a deflecting-reflecting face represented by the following general formula, $Y^2 = 2R_m X - (K+1)X^2$, where X designates a coordinate in the direction of an optical axis and Y designates a coordinate in a direction perpendicular to the optical axis with a position on the optical axis as an origin, and $R_m$ designates a radius of curvature on the optical axis and K designates a conical constant. The image forming reflecting mirror has a concave mirror face of a barrel or saddle type in the cross scan-corresponding direction which is separated by a distance Rs from a mirror face on the optical axis and is formed by rotating the shape with an axis perpendicular to the optical axis on the deflecting-reflecting face as a rotational axis. A new conical constant $E = K + 1$ satisfies the following condition, $-2 \leq E \leq 15$.

14 Claims, 16 Drawing Sheets

----- : MAIN SCAN
——— : CROSS SCAN

IMAGE FORMING REFLECTING MIRROR FOR CONSTANT SPEED OPTICAL SCAN AND OPTICAL SCANNER

BACKGROUND OF THE INVENTION

1. Field of the Invention

The present invention relates to an image forming reflecting mirror for a constant speed optical scan and an optical scanner using this reflecting mirror.

2. Description of the Related Art

In a general well-known optical scanning system, an optical scanning operation is performed by deflecting a light beam at an equal angular velocity and forming a light spot on a scanned face by an image forming optical system.

In the image forming optical system, an $f\theta$ lens is widely known and is used. However, a concave mirror has been recently used instead of the $f\theta$ lens.

However, when a light beam incident to the concave mirror is set to a parallel light beam, the length of an optical path from the concave mirror to the scanned face is increased so that it is difficult to make an optical scanner compact.

It is therefore considered that the light beam incident to the concave mirror used instead of the $f\theta$ lens is set to be convergent so as to reduce the length of the optical path from the concave mirror to the scanned face and make the optical scanner compact.

When a face of the concave mirror used instead of the $f\theta$ lens is formed by a general spherical face or a normal quadratic surface, it is possible to preferably correct field curvature. However, it is very difficult to preferably correct the linearity of an image.

SUMMARY OF THE INVENTION

It is therefore an object of the present invention to provide an image forming reflecting mirror for a constant speed optical scan for preferably correcting field curvature and the linearity of an image, and provide an optical scanner using this image forming reflecting mirror.

Another object of the present invention is to provide an image forming reflecting mirror for a constant speed optical scan and an optical scanner using this image forming reflecting mirror in which field curvature and the linearity of an image can be preferably corrected and a so-called deflecting face inclination of a deflecting means can be corrected.

The above objects of the present invention can be achieved by an image forming reflecting mirror for a constant speed optical scan in which a convergent light beam is deflected at an equal angular velocity and is further converged to form a light spot on a scanned face so as to optically scan the scanned face at a constant speed; the image forming reflecting mirror comprising an aspherical concave reflecting face of a hyperboloidal type having a function for correcting field curvature and linearity; the aspherical concave reflecting face having a conical constant K satisfying $K < -1$ and an aspherical coefficient $A_4$ of a fourth order satisfying $A_4 \neq 0$.

The above objects of the present invention can be also achieved by an optical scanner comprising a light source; a condenser lens for converging a light beam emitted from the light source; a light deflector for deflecting a convergent light beam from the condenser lens at an equal angular velocity; a concave mirror for reflecting a deflected light beam from the light deflector to form a light spot on a scanned face; and light beam splitting means for separating a light beam reflected on the concave mirror from an incident optical path from the light source to the concave mirror; the concave mirror being constructed by an image forming reflecting mirror for a constant speed optical scan.

The above objects of the present invention can be also achieved by an image forming reflecting mirror for a constant speed optical scan in which a light beam is convergent in a main scan-corresponding direction and is divergent in a cross scan-corresponding direction with a point near a starting point of deflection as a starting point of the light beam, and the light beam is deflected at an equal angular velocity and is converged to form a light spot on a scanned face so as to optically scan the scanned face at a constant speed. The image forming reflecting mirror has a shape on a deflecting-reflecting face represented by the following general formula:

$$X = Y^2/\{R_m + \sqrt{[R_m^2 - (1+K)Y^2]}\} + A_2Y^2 + A_3Y^3 + A_4Y^4 + \ldots$$

In this formula, X designates a coordinate in the direction of an optical axis and Y designates a coordinate in a direction perpendicular to the optical axis with a position on the optical axis as an origin, and $R_m$ designates a radius of curvature on the optical axis, K a conical constant, $A_2$, $A_3$, $A_4$, --- aspherical coefficients, and symbol $\sqrt{[]}$ designates a square root of a value within bracket []. The image forming reflecting mirror has a concave aspherical toroidal mirror face in the cross scan-corresponding direction which is separated by a distance $R_s$ from a mirror face on the optical axis and is formed by rotating the above shape with an axis perpendicular to the optical axis on the deflecting-reflecting face as a rotational axis. A distance S on a deflecting scanning face between a natural convergent point of the deflected light beam in the main scan-corresponding direction and the starting point of deflection, and the values $R_m$, K and $A_4$ satisfy the following conditions:

$$-1.7 \cdot 10^5 < S \cdot R_m < -0.7 \cdot 10^5$$

$$-8.0/10^9 < A_4/K < 8.0/10^9$$

$$-0.4 < R_s/S < -0.3$$

The above objects of the present invention can be also achieved by an optical scanner comprising a light source; a condenser lens for converging a light beam emitted from the light source; a linear image forming lens for focusing and forming a convergent light beam from the condenser lens as a linear image extending in a main scan-corresponding direction; a light deflector having a deflecting-reflecting face in the vicinity of a forming position of the linear image and deflecting a light beam from a side of the linear image forming lens at an equal angular velocity; a concave mirror for reflecting a deflected light beam from the light deflector to form a light spot on a scanned face; and light beam splitting means for separating a light beam reflected on the concave mirror from an incident optical path from the light source to the concave mirror; the concave mirror being constructed by an image forming reflecting mirror for a constant speed optical scan.

The above objects of the present invention can be also achieved by an image forming reflecting mirror for a constant speed optical scan in which a light beam is divergent in a cross scan-corresponding direction with a point near a starting point of deflection as a starting point of the light beam, and the light beam is deflected at an equal angular velocity and is converged to form a light spot on a scanned face so as to optically scan the scanned face at a constant speed. The image forming reflecting mirror has a shape on a deflecting-reflecting face represented by the following general formula:

$$Y^2 = 2R_m X - (K+1)X^2.$$

In this formula, X designates a coordinate in the direction of an optical axis and Y designates a coordinate in a direction perpendicular to the optical axis with a position on the optical axis as an origin, and $R_m$ designates a radius of curvature on the optical axis and K designates a conical constant. The image forming reflecting mirror has a concave mirror face of a barrel or saddle type in the cross scan-corresponding direction which is separated by a distance $R_s$ from a mirror face on the optical axis and is formed by rotating the above shape with an axis perpendicular to the optical axis on the deflecting-reflecting face as a rotational axis. A new conical constant $E = K + 1$ satisfies the following condition:

$$-2 \leq E \leq 15.$$

In accordance with the above-mentioned structures, field curvature and the linearity of an image are preferably corrected by using an aspherical face in the image forming reflecting mirror for a constant speed optical scan and the optical scanner using this image forming reflecting mirror. Further, a so-called deflecting face inclination of a deflecting means can be corrected.

Further objects and advantages of the present invention will be apparent from the following description of the preferred embodiments of the present invention as illustrated in the accompanying drawings.

DESCRIPTION OF THE PREFERRED EMBODIMENTS

Figure 1:
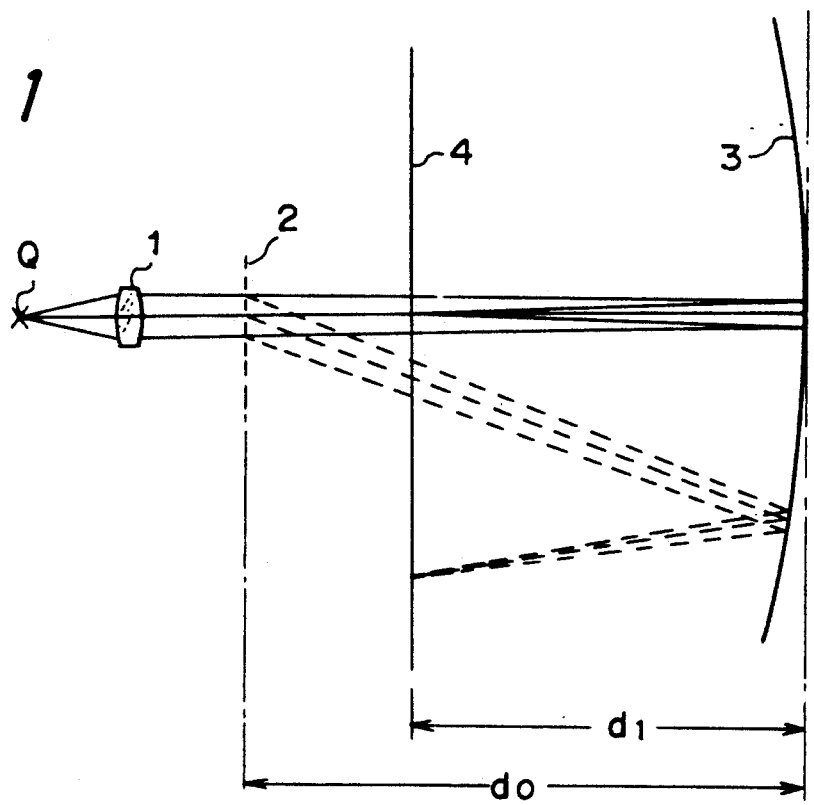
FIG. 1 is a view for explaining an image forming reflecting mirror for an equal speed optical scan in accordance with a first structure of the present invention.

The preferred embodiments of an image forming reflecting mirror for a constant speed optical scan and an optical scanner in the present invention will next be described in detail with reference to the accompanying drawings.

In an image forming reflecting mirror for a constant speed optical scan in accordance with each of first and second structures of the present invention, a convergent light beam is deflected at an equal angular velocity and is further converged to form a light spot on a scanned face so as to optically scan the scanned face at a constant speed.

In the first structure of the present invention, this image forming reflecting mirror is of a hyperboloidal type and has a function for correcting field curvature and linearity. The image forming reflecting mirror has a conical constant K satisfying $K > -1$ and an aspherical coefficient $A_4$ of a fourth order satisfying $A_4 \neq 0$.

An aspherical face is formed by rotating a curve represented by the following formula around an optical axis, i.e., an X-axis:

$$X = Y^2/\{R + \sqrt{\{R^2 - (1+K)Y^2\}}\} + A_2 Y^2 + A_3 Y^3 + A_4 Y^4 + \ldots$$

In this formula, R designates a radius of curvature on the optical axis, K a conical constant, and $A_2$, $A_3$ and $A_4$ respectively designate aspherical coefficients of second, third and fourth orders. Further, X and Y coordinates are respectively set in a direction of the optical axis and a direction perpendicular to this optical axis.

When the conical constant $K < 1$ is satisfied, the aspherical face is of a hyperboloidal type. The aspherical coefficients of higher orders except for $A_4$ can be set to zero or finite values.

In the image forming reflecting mirror for a constant speed optical scan in the second structure of the present invention, reference numeral S designates a distance from a starting point of deflection of the convergent light beam deflected at the equal angular velocity to a natural convergent point of the convergent light beam. The natural convergent point is located in a position in which the convergent light beam is naturally converged by convergence thereof. Reference numeral R designates a radius of curvature of a reflecting face on the optical axis. The distance S, the radius R of curvature, the conical constant K, and the aspherical coefficient $A_4$ of the fourth order satisfy the following conditions:

(2-1) $-2.0 < R/S < -1.0$ (2-2) $-1.0/10^8 < A_4/K < 1.0/10^8$.

An optical scanner in accordance with a third structure of the present invention has a light source, a condenser lens, a light deflector, a concave mirror, and a light beam splitting means.

The light source can be constructed by a laser light source such as a semiconductor laser, or a light emitting diode.

The condenser lens converges a light beam emitted from the light source.

The light deflector deflects a convergent light beam from the condenser lens at an equal angular velocity.

The concave mirror reflects a deflected light beam from the light deflector to form a light spot on a scanned face. The concave mirror is constructed by the image forming reflecting mirror for a constant speed optical scan having the first or second structure of the present invention.

The light beam splitting means separates a light beam reflected on the concave mirror from an incident optical path from the light source to the concave mirror.

The image forming reflecting mirror for a constant speed optical scan in each of the first and second structures has no function for correcting the inclination of a reflecting face. Accordingly, when a rotary polygon mirror is used as a deflector in the optical scanner using such an image forming reflecting mirror, it is necessary to sufficiently correct the inclination of a reflecting face. In accordance with a fourth structure of the present invention, the light deflector is preferably constructed by a tenon type mirror including one or two mirror faces and having no inclination of a reflecting face. In accordance with a fifth structure of the present invention, the light deflector is preferably constructed by a pyramidal mirror having no inclination of a reflecting face.

In an image forming reflecting mirror for a constant speed optical scan in each of sixth, eighth, ninth and tenth structures of the present invention, a light beam is convergent in a main scan-corresponding direction and is divergent in a cross scan-corresponding direction with a point near a starting point of deflection as a starting point of the light beam. The light beam is deflected at an equal angular velocity and is converged to form a light spot on a scanned face so as to optically scan the scanned face at a constant speed.

The image forming reflecting mirror for a constant speed optical scan in the sixth structure of the present invention has a shape on a deflecting-reflecting face represented by the following general formula:

$$X = Y^2/\{R_m + \sqrt{[R_m^2 - (1+K)Y^2]}\} + A_2 Y^2 + A_3 Y^3 + A_4 Y^4 + \ldots$$

In this formula, X designates a coordinate in the direction of an optical axis and Y designates a coordinate in a direction perpendicular to the optical axis with a position on the optical axis as an origin. Further, $R_m$ designates a radius of curvature on the optical axis, K a conical constant, $A_2$, $A_3$, $A_4$, --- aspherical coefficients, and symbol $\sqrt{[\ ]}$ designates a square root of a value within bracket [ ].

Figure 5:
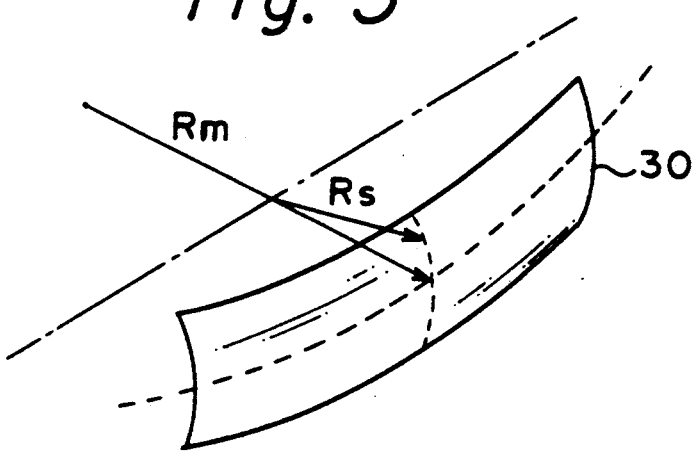
FIG. 5 is a view for explaining an image forming reflecting mirror for a constant speed optical scan in accordance with a sixth structure of the present invention.

The image forming reflecting mirror has a concave aspherical toroidal mirror face in the cross scan-corresponding direction. This concave aspherical toroidal mirror face is separated by a distance $R_s$ from a mirror face on the optical axis and is formed by rotating the above shape with an axis perpendicular to the optical axis on the deflecting-reflecting face as a rotational axis. The concave aspherical toroidal mirror face is shown by reference numeral 30 in FIG. 5. The deflecting-reflecting face is a face formed by moving a principal ray of an ideally deflected light beam.

In the image forming reflecting mirror for a constant speed optical scan in the sixth structure of the present invention, reference numeral S designates a distance on a deflecting scanning face between a natural convergent point of the deflected light beam in the main scan-corresponding direction and the starting point of deflection. This natural convergent point is located in a position in which the deflected light beam is converged in the main scan-corresponding direction when no image forming action of the image forming reflecting mirror for a constant speed optical scan is taken with respect to this deflected light beam. The distance S and the above values $R_m$, K and $A_4$ satisfy the following conditions:

(6-1) $-1.7 \cdot 10^5 < S \cdot R_m < -0.7 \cdot 10^5$ (6-2) $-8.0/10^9 < A_4/K < 8.0/10^9$ (6-3) $-0.4 < R_s/S < -0.3$.

In the above conditions, the aspherical coefficients of higher orders except for $A_4$ can be set to zero or finite values.

The image forming reflecting mirror for a constant speed optical scan in the eighth structure of the present invention has a shape on a deflecting-reflecting face represented by the following general formula:

$$Y^2 = 2R_m X - (K+1)X^2.$$

In this formula, X designates a coordinate in the direction of an optical axis and Y designates a coordinate in a direction perpendicular to the optical axis with a position on the optical axis as an origin. Further, $R_m$ designates a radius of curvature on the optical axis and K designates a conical constant.

Figure 6A:
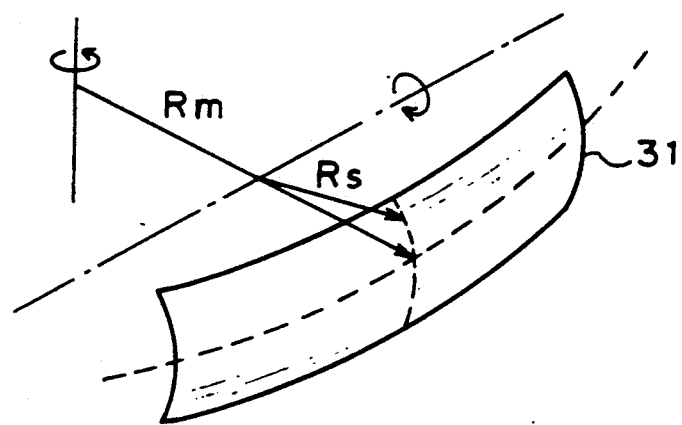
FIGS. 6a and 6b are views for explaining an image forming reflecting mirror for a constant speed optical scan in accordance with an eighth structure of the present invention, and respectively correspond to $R_s < 0$ and $R_s > 0$.
Figure 6B:
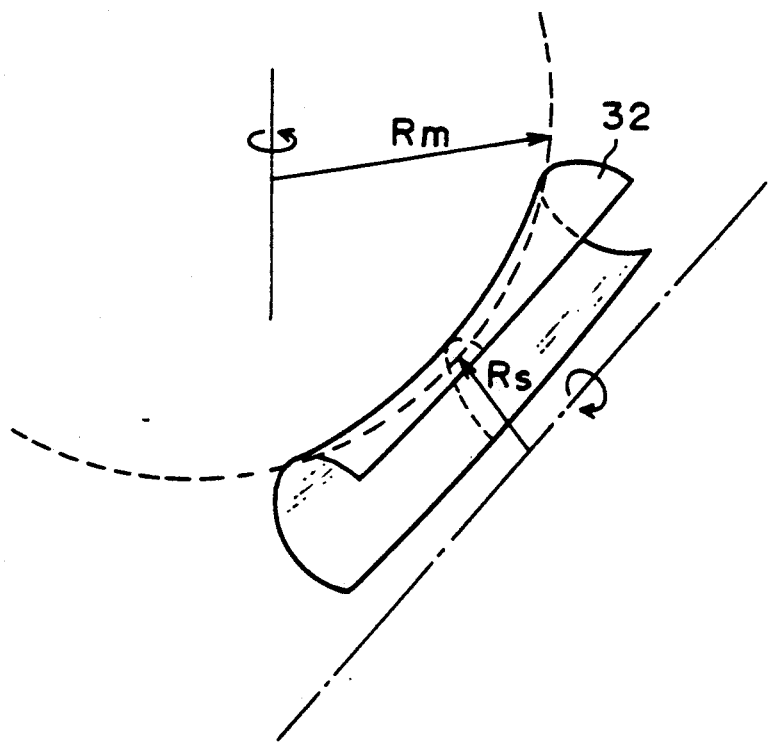

The image forming reflecting mirror has a concave mirror face of a barrel or saddle type in the cross scan-corresponding direction. This concave mirror face is separated by a distance $R_s$ from a mirror face on the optical axis and is formed by rotating the above shape with an axis perpendicular to the optical axis on the deflecting-reflecting face as a rotational axis. The concave mirror face of the barrel type is shown by reference numeral 31 in FIG. 6a. The concave mirror face of the saddle type is shown by reference numeral 32 in FIG. 6b. A new conical constant $E = K+1$ satisfies the following condition (8-1):

(8-1) $-2 \leq E \leq 15$.

In the image forming reflecting mirror for a constant speed optical scan in the ninth structure of the present invention, reference numeral $S_0$ designates a distance between a natural convergent point of the deflected light beam at an angle 0 of deflection in the main scan-corresponding direction and a face of the image forming reflecting mirror for a constant speed optical scan. The distance $S_0$ and the new conical constant E satisfy the following conditions in addition to the above condition set in the eighth structure of the present invention:

(9-1) When $-2 \leq E \leq 0$, $-0.65E - 0.4 \leq R_m/S_0 \leq -0.65E + 0.32$ (9-2) When $0 \leq E \leq 15$, $-1.72E - 0.4 \leq R_m/S_0 \leq -1.22E + 0.32$.

In the image forming reflecting mirror for a constant speed optical scan in the tenth structure of the present invention, the radius $R_m$ of curvature, the distance $R_s$ and the new conical constant E further satisfy the following conditions in addition to the above conditions set in the eighth and ninth structures of the present invention:

(10-1) When $-2 \leq E \leq 0$, $0.3E + 1.9 \leq R_m/R_s \leq 0.4E + 3.1$ (10-2) When $0 \leq E \leq 15$, $-0.8E + 1.9 \leq R_m/R_s \leq 1.79E + 3.1$.

An optical scanner in accordance with each of seventh and eleventh structures of the present invention has a light source, a condenser lens, a light deflector and a concave mirror similar to those in the optical scanner having each of the third, fourth and fifth structures. The optical scanner in each of the seventh and eleventh structures further has a linear image forming lens for focusing and forming a convergent light beam from the condenser lens as a linear image extending in a main scan-corresponding direction. The linear image is formed in the vicinity of a deflecting-reflecting face of the light deflector. Accordingly, the light beam deflected by the light deflector is convergent in the main scan-corresponding direction and is divergent in the cross scan-corresponding direction with a position of the linear image as a starting point of deflection on the deflecting-reflecting face. This deflected light beam is reflected on the concave mirror and is focused and formed as a light spot on the scanned face.

In the optical scanner in the seventh structure, the image forming reflecting mirror for a constant speed optical scan having the sixth structure is used as this concave mirror. In the optical scanner in the eleventh structure, the image forming reflecting mirror for a constant speed optical scan having the eighth, ninth or tenth structure is used as this concave mirror.

The image forming reflecting mirror for a constant speed optical scan in each of the sixth, eighth, ninth and tenth structures has a function for correcting the inclination of a reflecting face in the cross scan-corresponding direction. This correcting function is provided since the linear image in the vicinity of the deflecting-reflecting face is focused and formed as an image on the scanned face with this linear image as an object. Accordingly, in the optical scanner having each of the seventh and eleventh structures, a normal rotary polygon mirror can be used as the light deflector.

FIG. 1 shows the basic construction of an optical scanner in accordance with the third structure of the present invention. In FIG. 1, a semiconductor laser Q is used as a light source.

A divergent light beam is emitted from the light source Q and is changed to a convergent light beam by a condenser lens 1. The convergent light beam is then reflected on a deflecting-reflecting face 2 of a light deflector and is deflected at an equal angular velocity by a deflecting action of the light deflector. The light deflector may be constructed by a unifacial tenon type mirror.

The deflected light beam is reflected on an image forming reflecting mirror 3 for a constant speed optical scan.

The convergent light beam incident to the image forming reflecting mirror 3 is further converged by this reflecting mirror 3 and is formed as a light spot on a scanned face 4. The scanned face 4 is optically scanned by the light spot at a constant speed in accordance with deflection of the deflected light beam.

When the image forming reflecting mirror 3 is constructed by an aspherical face in accordance with the first structure of the present invention, it is possible to preferably correct both field curvature and the linearity of an image in an optical scanning operation at a wide field angle.

The condition (2-1) in the second structure of the present invention is a condition for preferably correcting field curvature. When the ratio R/S in this condition (2-1) exceeds an upper limit thereof, the field curvature in a cross scanning direction is excessively increased. In contrast to this, when the ratio R/S in this condition (2-1) exceeds a lower limit thereof, the field curvature is excessively decreased. Accordingly, it is difficult to preferably correct the field curvature outside the range of the condition (2-1).

The condition (2-2) is a condition for preferably correcting the linearity of an image. When the ratio $A_4/K$ in the condition (2-2) exceeds an upper limit thereof, the linearity of an image is increased on a positive side. In contrast to this, when the ratio $A_4/K$ in the condition (2-2) exceeds a lower limit thereof, the linearity of an image is increased on a negative side. Accordingly, it is difficult to preferably correct the linearity of an image outside each of the upper and lower limits.

Figure 7:
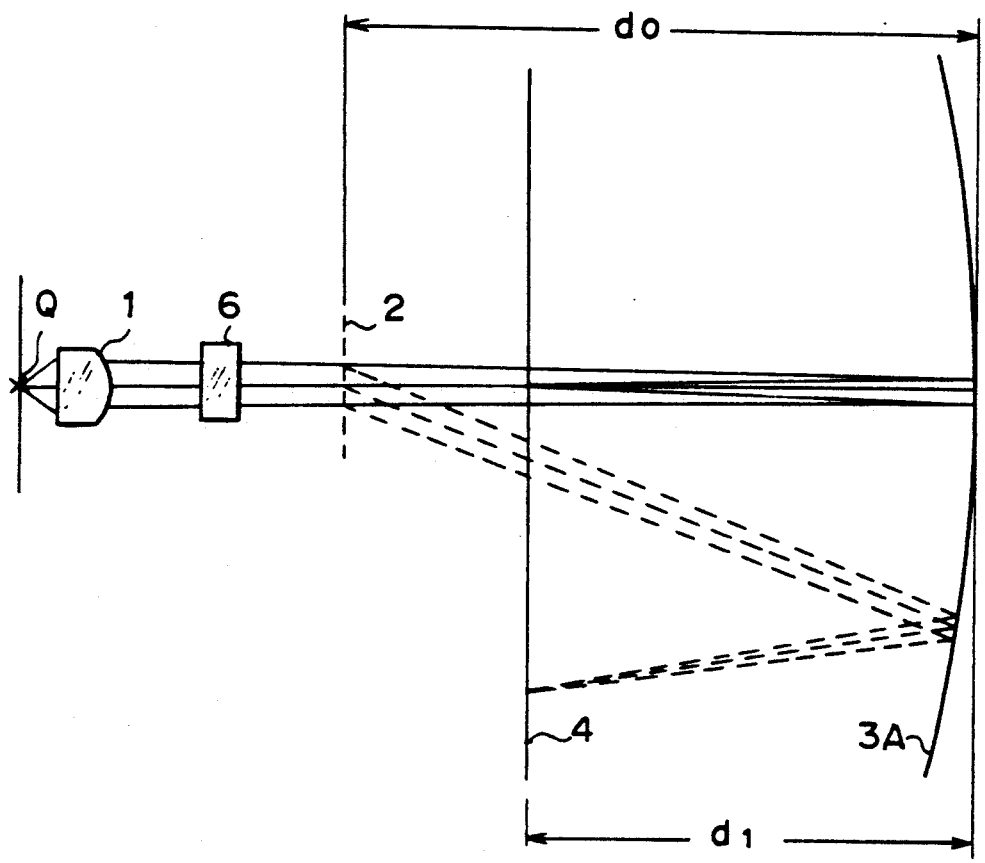
FIG. 7 is a view for explaining an optical scanner using an image forming reflecting mirror for a constant speed optical scan in accordance with each of sixth, eighth, ninth and tenth structures of the present invention.

FIG. 7 shows the basic construction of an optical scanner in accordance with each of the seventh and eleventh structures of the present invention. A divergent light beam is emitted from a light source Q constructed by a semiconductor laser and is changed by a condenser lens 1 to a convergent light beam. The convergent light beam is then incident to a linear image forming lens 6. The linear image forming lens 6 has positive refracting power only in a cross scan-corresponding direction. This cross scan-corresponding direction is a direction perpendicular to a paper face in FIG. 7. The linear image forming lens 6 further converges the convergent light beam in the cross scan-corresponding direction. Thus, a linear image extending in a main scan-corresponding direction is formed in the position of a deflecting-reflecting face 2 of a light deflector.

A light beam reflected on the deflecting-reflecting face 2 of the light deflector is deflected by a deflecting action of the light deflector at an equal angular velocity. Convergence of this deflected light beam is maintained by a convergent action of the condenser lens 1 in the main scan-corresponding direction. This deflected light beam is divergent in the cross scan-corresponding direction and a starting point of deflection is set to a starting point of the deflected light beam. The deflected light beam is incident to an image forming reflecting mirror 3A for a constant speed optical scan.

The deflected light beam is reflected on the image forming reflecting mirror 3A and is converged in both the main scan-corresponding direction and the cross scan-corresponding direction. Thus, the converged light beam is formed as a light spot on a scanned face 4. The scanned face 4 is optically scanned by the light spot at a constant speed in accordance with deflection of the deflected light beam.

The condition (6-1) in the sixth structure of the present invention is a condition for preferably correcting field curvature in a main scanning direction. When the ratio $SR_m$ in this condition (6-1) exceeds an upper limit thereof, the field curvature in the main scanning direction is excessively increased. In contrast to this, when the ratio $SR_m$ in this condition (6-1) exceeds a lower limit thereof, the field curvature in the main scanning direction is excessively decreased. Accordingly, it is difficult to preferably correct the field curvature outside the range of the condition (6-1) in the main scanning direction.

The condition (6-2) is a condition for preferably correcting field curvature in the cross scanning direction and the linearity of an image. When the ratio $A_4/K$ in this condition (6-2) exceeds an upper limit thereof, the field curvature in the cross scanning direction is excessively decreased and the linearity of an image is increased on a positive side. In contrast to this, when the ratio $A_4/K$ in this condition (6-2) exceeds a lower limit thereof, the field curvature in the cross scanning direction is excessively increased and the linearity of an image is increased on a negative side. Accordingly, it is difficult to preferably correct the field curvature and the linearity of an image outside each of the upper and lower limits.

The condition (6-3) is a condition for correcting field curvature in the cross scanning direction. When the ratio $R_s/S$ in the condition (6-3) exceeds an upper limit thereof, the field curvature in the cross scanning direction is excessively decreased. In contrast to this, when the ratio $R_s/S$ in the condition (6-3) exceeds a lower limit thereof, the field curvature in the cross scanning direction is excessively increased. Accordingly, it is difficult to preferably correct the field curvature outside the range of the condition (6-3).

The condition (8-1) in the eighth structure of the present invention is a condition for preferably setting field curvature in the main scanning direction and enabling a practical layout.

When the conical constant E in the condition (8-1) exceeds a lower limit thereof, the field curvature in the main scanning direction is excessively increased. Therefore, it is difficult to change the diameter of a light spot in the main scanning direction within a required range in an entire scanning region. In contrast to this, when the conical constant E in the condition (8-1) exceeds an upper limit thereof, a distance between the image forming reflecting mirror and the scanned face is excessively reduced so that it is difficult to set a practical layout.

The conditions (9-1) and (9-2) in the ninth structure of the present invention are conditions for preferably holding $f\theta$ characteristics. When the ratio $R_m/S_0$ in each of the conditions (9-1) and (9-2) exceeds a lower limit thereof, the $f\theta$ characteristics are excessively provided. In contrast to this, when the ratio $R_m/S_0$ in each of the conditions (9-1) and (9-2) exceeds an upper limit thereof, the $f\theta$ characteristics are insufficiently provided. Accordingly, it is difficult to set the speed of a scanning operation within an allowable constant speed region.

The conditions (10-1) and (10-2) in the tenth structure of the present invention are conditions for preferably holding field curvature in the cross scanning direction. When the ratio $R_m/R_s$ in each of the conditions (10-1) and (10-2) exceeds a lower limit thereof, the field curvature in the cross scanning direction is excessively increased. In contrast to this, when the ratio $R_m/R_s$ in each of the conditions (10-1) and (10-2) exceeds an upper limit thereof, the field curvature in the cross scanning direction is excessively decreased. Accordingly, it is difficult to set a change in diameter of the light spot in the cross scanning direction within an allowable width region.

The general formula in the eighth structure of the present invention is represented by $$Y^2 = 2R_m X - (K+1)X^2.$$

This general formula determines the shape of a reflecting face on a deflecting-reflecting face. This general formula is not a single formula as an analytical representation. This general formula can be represented by an approximate formula if necessary. For example, the following polynomial, $$X = \Sigma D_{2N} \cdot Y^{**2N}$$

can be used in this approximate formula. In this polynomial, summation is taken from value 1 to an infinite number $\infty$ with respect to integer N and symbol **2N represents a power of 2N. If coefficient $D_{2N}$ and the number of terms are suitably selected, this polynomial can be set to be close to the above general formula, $$Y^2 = 2R_m X - (K+1)X^2$$

as much as possible with respect to the shape of a reflecting face. In the eighth structure of the present invention, the shape of a reflecting face on the deflecting-reflecting face represented by the above general formula, $$Y^2 2R_m X - (K+1)X^2$$

includes an approximate reflecting face shape substantially providing the same function as the image forming reflecting mirror for a constant speed optical scan specified by the general formula with respect to the shape of a reflecting face. In this case, the approximate reflecting face shape may be formed by an arbitrary polynomial representation.

Concrete Embodiments 1 to 5 of the image forming reflecting mirror for a constant speed optical scan in accordance with the second structure of the present invention will first be described.

As mentioned above, reference numeral S designates a distance from a starting point of deflection of a convergent light beam deflected at an equal angular velocity to a natural convergent point of the convergent light beam. In this case, the starting point of deflection is located on the deflecting-reflecting face 2 shown in FIG. 1. Reference numeral R designates a radius of curvature of a reflecting face of the image forming reflecting mirror 3 for a constant speed optical scan on an optical axis. Reference numeral K designates a conical constant. Reference numeral $A_4$ designates an aspherical coefficient of the fourth order. As shown in FIG. 1, reference numeral $d_0$ designates a distance on the optical axis from the deflecting-reflecting face 2 to a reflecting face of the image forming reflecting mirror 3 for a constant speed optical scan. Reference numeral $d_1$ designates a distance on the optical axis from this reflecting face of the image forming reflecting mirror 3 to the scanned face 4.

With respect to $A_4$ and $A_4/K$, alphabet E and a number after this alphabet E show a power. For example, E-8 shows $1/10^8$. This value $1/10^8$ is multiplied by a number before this alphabet E.

EMBODIMENT 1

| R | $d_0$ | $d_1$ |
|---|---|---|
| −396.63 | 132.21 | 73.79 |
| S = 249.73, K = −2.0, $A_4$ = −0.73 E-8. | | |

Values in conditional formulas
R/S = −1.59, $A_4/K$ = 0.36 E-8
Writing width: 221.0
Linearity: equal to or less than 1.5%.

EMBODIMENT 2

| R | $d_0$ | $d_1$ |
|---|---|---|
| −500.00 | 106.52 | 115.87 |
| S = 322.47, K = −2.0, $A_4$ = −0.50 E-8 | | |

Values in conditional formulas
R/S = −1.55, $A_4/K$ = −0.25 E-8
Writing width: 240.0
Linearity: equal to or less than 15.0%.

EMBODIMENT 3

| R | $d_0$ | $d_1$ |
|---|---|---|
| −500.00 | 80.0 | 123.09 |
| S = 322.47, K = −2.0, $A_4$ = 1.50 E-8 | | |

Values in conditional formulas
R/S = −1.55, $A_4/K$ = −0.75 E-8
Writing width: 216.0
Linearity: equal to or less than 24.1%.

EMBODIMENT 4

| R | $d_0$ | $d_1$ |
|---|---|---|
| −290.00 | 90.0 | 51.60 |
| S = 170.0, K = −4.0, $A_4$ = −2.30 E-8 | | |

Values in conditional formulas
R/S = −1.70, $A_4/K$ = 0.58 E-8
Writing width: 197.0
Linearity: equal to or less than 7.3%.

EMBODIMENT 5

| R | $d_0$ | $d_1$ |
|---|---|---|
| −356.34 | 123.94 | 54.0 |
| S = 197.75, K = −2.0, $A_4$ = −1.5 E-8 | | |

Values in conditional formulas
R/S = −1.16, $A_4/K$ = 0.75 E-8
Writing width: 221.0
Linearity: equal to or less than 1.1%.

FIGS. 4a to 4e respectively show field curvatures with respect to these Embodiments 1 to 5. In FIGS. 4a to 4e, the main scanning direction is shown by a broken line and the cross scanning direction is shown by a solid line. As can be seen from FIGS. 4a to 4e, the field curvature in each of the Embodiments 1 to 5 is preferably corrected and the linearity of an image in each of the Embodiments 1 to 5 is also preferable. The linearity in the Embodiment 3 is equal to or less than 24.1% and is worst. However, it is sufficient to electrically correct the linearity when the linearity has a small value such as 24.1%.

Figure 2:
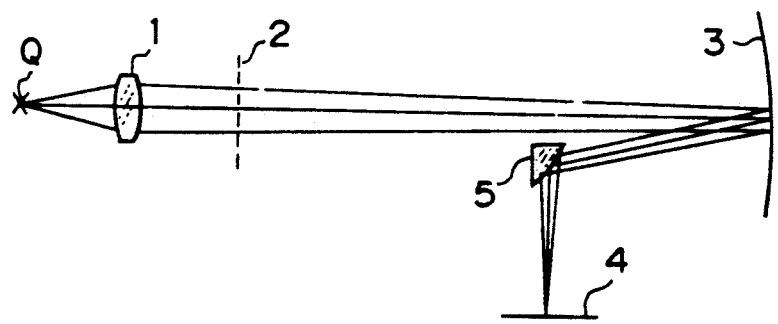
FIG. 2 is a schematic view showing an optical scanner in accordance with one embodiment of the present invention.

FIG. 2 schematically shows only a main portion of an optical scanner in accordance with one embodiment of the present invention. An elongated mirror 5 extends in a direction perpendicular to a paper face. A scanned medium such as a photoconductive-photosensitive body is arranged in the position of a scanned face 4.

A face of an image forming reflecting mirror 3 for a constant speed optical scan is slightly inclined with respect to the incident direction of a light beam such that no light reflected on the image forming reflecting mirror 3 is returned onto the side of a light source Q. The light beam reflected on the image forming reflecting mirror 3 is further reflected on the elongated mirror 5 and is guided onto the scanned face 4.

In this embodiment, a light beam splitting means is constructed by the elongated mirror 5 and an arrangement for inclining the face of the image forming reflecting mirror 3 for a constant speed optical scan.

When the image forming reflecting mirror 3 is inclined in this embodiment, a scanning line is also slanted. However, a slanting amount of the scanning line can be substantially reduced to a negligible amount by reducing an inclination angle of the image forming reflecting mirror 3.

Figure 3:
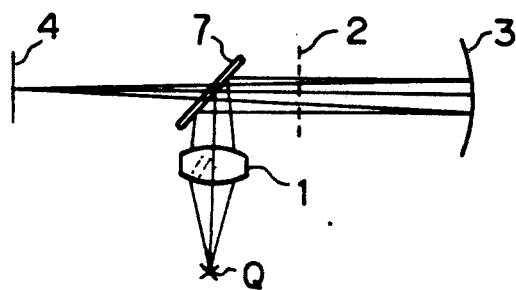
FIG. 3 is a schematic view showing an optical scanner in accordance with another embodiment of the present invention.
Figures 4A, 4B, 4C:
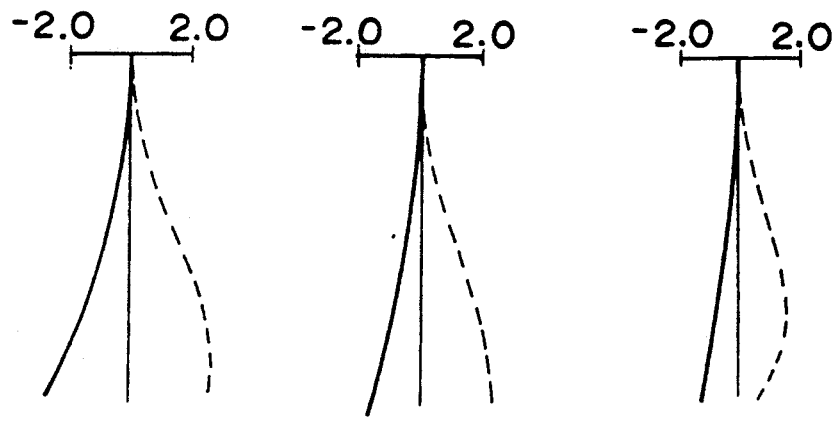
FIGS. 4a to 4e are diagrams showing the field curvature of an image forming reflecting mirror for a constant speed optical scan in accordance with a second structure of the present invention, and respectively correspond to Embodiments 1 to 5.
Figures 4D, 4E:
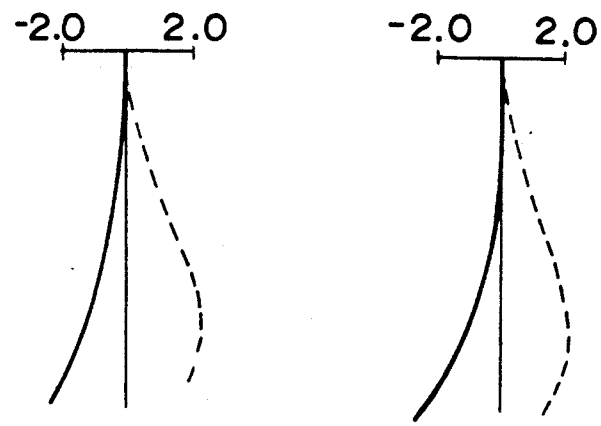

FIG. 3 shows an optical scanner in accordance with another embodiment of the present invention.

In this embodiment, a light beam is converged by a condenser lens 1 and is reflected on an elongated semitransparent mirror 7 on the side of an image forming reflecting mirror 3 for a constant speed optical scan. The semitransparent mirror 7 extends in a direction perpendicular to a paper face. The light beam reflected on the reflecting mirror 3 is transmitted through the semitransparent mirror 7 and is formed as a light spot on a scanned face 4. Thus, an optical scanning operation is performed by the light spot on the scanned face 4. In this embodiment, a light beam splitting means is constructed by the elongated semitransparent mirror 7. Further, in this embodiment, it is not necessary to incline the image forming reflecting mirror 3 for a constant speed optical scan so that it is not necessary to consider the slant of a scanning line.

Concrete Embodiments 6 to 10 of an image forming reflecting mirror for a constant speed optical scan in the sixth structure of the present invention will next be described.

Values K, $A_4$, $d_0$ and $d_1$ are similar to those described with respect to the above image forming reflecting mirror for a constant speed optical scan in the second structure of the present invention. Further, reference numeral S designates a distance from a starting point of deflection of a convergent light beam deflected at an equal angular velocity to a natural convergent point of the convergent light beam in a main scan-corresponding direction. In this case, the starting point of deflection is located on the deflecting-reflecting face 2 shown in FIG. 7. Reference numeral $R_m$ designates a radius of curvature of a reflecting face of an image forming reflecting mirror 3A for a constant speed optical scan on an optical axis on a deflecting-reflecting face. Further, reference numeral $R_s$ designates a radius of curvature of the reflecting mirror 3A on a plane including the optical axis and perpendicular to a deflecting perpendicular plane.

EMBODIMENT 6

| $R_m$ | $R_s$ | $d_0$ | $d_1$ |
|---|---|---|---|
| −396.6 | −93.0 | 132.21 | 72.79 |
| $S = 249.7, K = -2.0, A_4 = -7.26$ E-9 | | | |

Values in conditional formulas
$S \cdot R_m = -99050$, $A_4/K = 3.63$ E-9, $R_s/S = -0.37$
Writing width: 220.8, Linearity: 1.56%

EMBODIMENT 7

| $R_m$ | $R_s$ | $d_0$ | $d_1$ |
|---|---|---|---|
| −500.0 | −111.0 | 106.5 | 115.9 |
| $S = 322.47, K = -2.0, A_4 = 5.0$ E-9 | | | |

Values in conditional formulas
$S \cdot R_m = -161235$, $A_4/K = -2.5$ E-9, $R_s/S = -0.34$
Writing width: 228.8, Linearity: 17.5%.

EMBODIMENT 8

| $R_m$ | $R_s$ | $d_0$ | $d_1$ |
|---|---|---|---|
| −500.0 | −97.0 | 80.0 | 123.1 |
| $S = 322.47, K = -2.0, A_4 = 1.5$ E-8 | | | |

Values in conditional formulas
$S \cdot R_m = -161235$, $A_4/K = -7.5$ E-9, $R_s/S = -0.301$
Writing width: 236, Linearity: 29.7%.

EMBODIMENT 9

| $R_m$ | $R_s$ | $d_0$ | $d_1$ |
|---|---|---|---|
| −356.34 | −71.0 | 123.94 | 52.4 |
| $S = 201.41, K = -2.0, A_4 = -1.5$ E-8 | | | |

Values in conditional formulas
$S \cdot R_m = 71769$, $A_4/K = -7.5$E-9, $R_s/S = -0.353$
Writing width: 214.1, Linearity: 1.37%.

EMBODIMENT 10

| $R_m$ | $R_s$ | $d_0$ | $d_1$ |
|---|---|---|---|
| −500.0 | −111.0 | 106.5 | 115.9 |
| $S = 322.47, K = -2.0, A_4 = 6.3$ E-9 | | | |

Values in conditional formulas
$S \cdot R_m = -161235$, $A_4/K = -3.15$E-9, $R_s/S = -0.344$
Writing width: 230.38, Linearity: 19.4%.

FIGS. 9a to 9e respectively show field curvatures with respect to these Embodiments 6 to 10. In FIGS. 9a to 9e, the main scanning direction is shown by a broken line and the cross scanning direction is shown by a solid line. As can be seen from FIGS. 9a to 9e, the field curvature in each of the Embodiments 6 to 10 is preferably corrected and the linearity of an image in each of the Embodiments 6 to 10 is also preferable. The linearity in the Embodiment 8 is equal to 29.7% and is worst. However, when the linearity is a small value such as 29.7%, it is sufficient to electrically correct the linearity.

Figure 8:
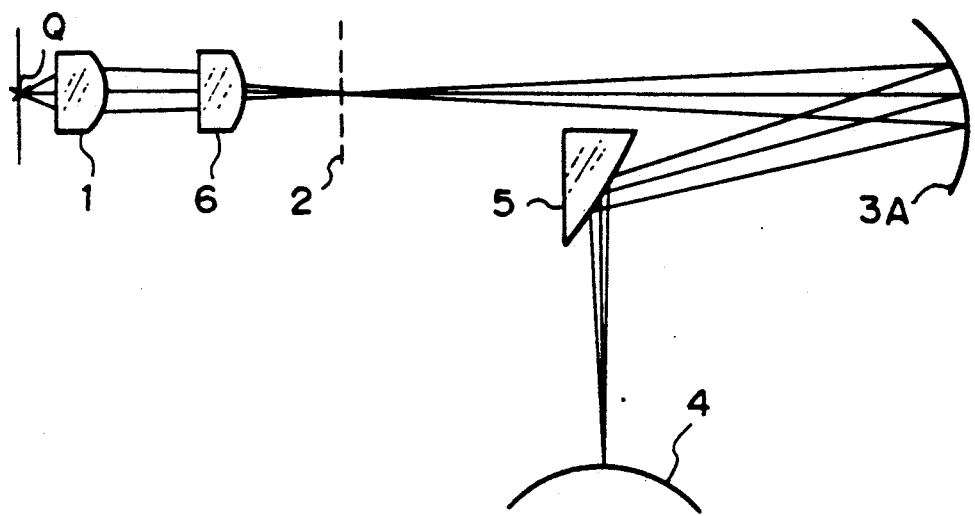
FIG. 8 is a schematic view showing an optical scanner having a seventh structure in accordance with one embodiment of the present invention.
Figure 9A:
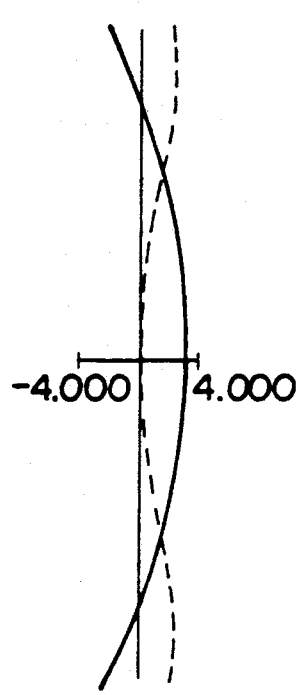
FIGS. 9a to 9e are diagrams showing field curvature of the image forming reflecting mirror for a constant speed optical scan having the sixth structure of the present invention, and respectively correspond to Embodiments 6 to 10.
Figure 9B:
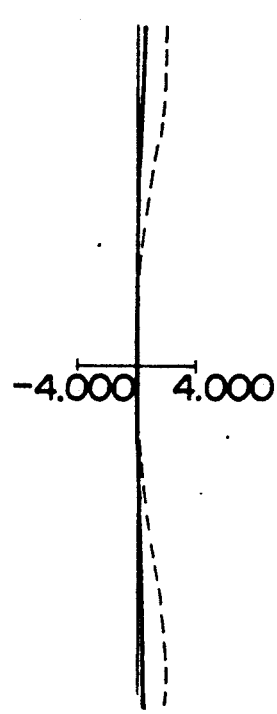
Figure 9C:
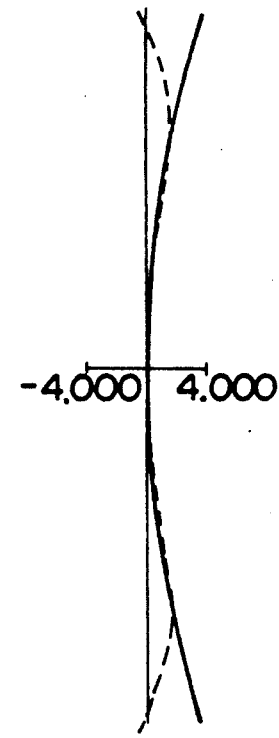
Figure 9D:
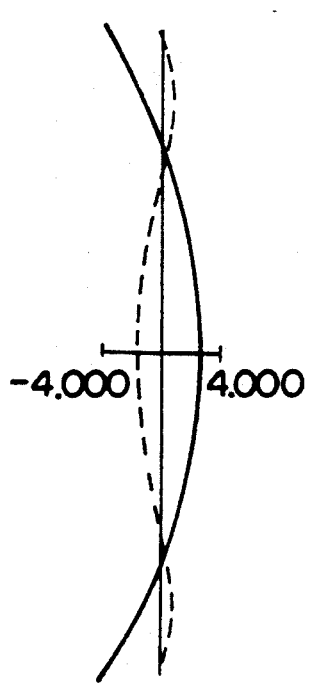
Figure 9E:
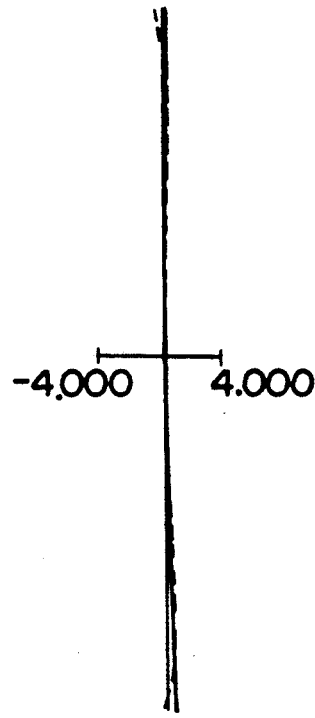

FIG. 8 schematically shows only a main portion of an optical scanner having the seventh structure in accordance with one embodiment of the present invention. Reference numeral 5 designates an elongated mirror. The other reference numerals are similar to those in FIG. 7. A scanned medium such as a photoconductive-photosensitive body is arranged in the position of a scanned face 4.

A face of an image forming reflecting mirror 3A for a constant speed optical scan is slightly inclined with respect to the incident direction of a light beam such that no light reflected on the image forming reflecting mirror 3A is returned onto the side of a light source Q. The light beam reflected on the reflecting mirror 3A is further reflected on the elongated mirror 5 and is guided onto the scanned face 4.

In this embodiment, a light beam splitting means is constructed by the elongated mirror 5 and an arrangement for inclining the face of the image forming reflecting mirror 3A for a constant speed optical scan.

Concrete Embodiments 11 to 29 with respect to the image forming reflecting mirror for a constant speed optical scan in each of the eighth to tenth structures of the present invention will next be described. In each of these Embodiments 11 to 29, parameters E, $R_m$ and $R_s$ specify an aspherical shape of a reflecting face. Parameters $R_m/S_0$, $R_m/R_s$ and $S_0$ in the above conditions (8-1), (9-1), (9-2), (10-1) and (10-2) are provided. Parameter $S_0$ is used to provide a natural convergent state of a deflected light beam. Parameter $L_0$ designates a shortest distance from a starting point of deflection of the deflected light beam to the reflecting face of the image forming reflecting mirror for a constant speed optical scan. Parameter $L_0$ is used to provide the position of an aspherical $f\theta$ mirror relative to a deflector. A writing width is set to 216 mm showing a letter size in each of the Embodiments 11 to 29.

EMBODIMENT 11

| $R_m$ | $R_s$ | $S_0$ | $L_0$ |
|---|---|---|---|
| −149.600 | −69.58 | −161.522 | 37.222 |
| E = −2 | | | |

Values in conditional formulas
$R_m/S_0 = 0.93$, $R_m/R_s = 2.2$
Angle of deflection = ±50 degrees.

EMBODIMENT 12

| $R_m$ | $R_s$ | $S_0$ | $L_0$ |
|---|---|---|---|
| −105.935 | −70.807 | −70.441 | 29.480 |
| E = −2 | | | |

Values in conditional formulas
$R_m/S_0 = 1.5$, $R_m/R_s = 1.5$
Angle of deflection = ±50 degrees.

EMBODIMENT 13

| $R_m$ | $R_s$ | $S_0$ | $L_0$ |
|---|---|---|---|
| −105.935 | −79.056 | −70.479 | 29.480 |
| E = −2 | | | |

Values in conditional formulas
$R_m/S_0 = 1.5$, $R_m/R_s = 1.3$
Angle of deflection = ±50 degrees.

EMBODIMENT 14

| $R_m$ | $R_s$ | $S_0$ | $L_0$ |
|---|---|---|---|
| −90.476 | −62.45 | −56.548 | 24.940 |
| E = −2 | | | |

Values in conditional formulas
$R_m/S_0 = 1.6$, $R_m/R_s = 1.45$
Angle of deflection = ±50 degrees.

EMBODIMENT 15

| $R_m$ | $R_s$ | $S_0$ | $L_0$ |
|---|---|---|---|
| −260.752 | −95.9 | 663.4 | 85.6 |
| E = 0 | | | |

Values in conditional formulas
$R_m/S_0 = 0.39$, $R_m/R_s = 2.7$
Angle of deflection = ±50 degrees.

EMBODIMENT 16

| $R_m$ | $R_s$ | $S_0$ | $L_0$ |
|---|---|---|---|
| −243.693 | −128.259 | −2493.44 | 73.108 |
| E = 0 | | | |

Values in conditional formulas
$R_m/S_0 = 0.1$, $R_m/R_s = 1.9$
Angle of deflection = ±50 degrees.

EMBODIMENT 17

| $R_m$ | $R_s$ | $S_0$ | $L_0$ |
|---|---|---|---|
| −243.693 | −93.091 | −2493.44 | 73.108 |
| E = 0 | | | |

Values in conditional formulas
$R_m/S_0 = 0.1$, $R_m/R_s = 2.6$
Angle of deflection = ±50 degrees.

EMBODIMENT 18

| $R_m$ | $R_s$ | $S_0$ | $L_0$ |
|---|---|---|---|
| −243.693 | −78.611 | −2493.44 | 73.108 |
| E = 0 | | | |

Values in conditional formulas
$R_m/S_0 = 0.1$, $R_m/R_s = 3.1$
Angle of deflection = ±50 degrees.

EMBODIMENT 19

| $R_m$ | $R_s$ | $S_0$ | $L_0$ |
|---|---|---|---|
| −231.508 | −88.73 | −730.55 | 65.55 |
| E = 0 | | | |

Values in conditional formulas
$R_m/S_0 = 0.32$, $R_m/R_s = 2.6$
Angle of deflection = ±50 degrees.

EMBODIMENT 20

| $R_m$ | $R_s$ | $S_0$ | $L_0$ |
|---|---|---|---|
| −326.446 | −33.73 | 36.272 | 114.256 |
| E = 5 | | | |

Values in conditional formulas
$R_m/S_0 = -9.0$, $R_m/R_s = 9.7$
Angle of deflection = ±50 degrees.

EMBODIMENT 21

| $R_m$ | $R_s$ | $S_0$ | $L_0$ |
|---|---|---|---|
| −322.413 | −50.402 | 41.741 | 112.845 |
| E = 5 | | | |

Values in conditional formulas
$R_m/S_0 = -7.7$, $R_m/R_s = 6.4$
Angle of deflection = ±50 degrees.

EMBODIMENT 22

| $R_m$ | $R_s$ | $S_0$ | $L_0$ |
|---|---|---|---|
| −326.446 | 163.223 | 46.289 | 114.256 |
| E = 5 | | | |

Values in conditional formulas
$R_m/S_0 = -7.1$, $R_m/R_s = -2.0$
Angle of deflection = ±50 degrees.

EMBODIMENT 23

| $R_m$ | $R_s$ | $S_0$ | $L_0$ |
|---|---|---|---|
| −326.446 | −27.204 | 46.289 | 114.256 |
| E = 5 | | | |

Values in conditional formulas
$R_m/S_0 = -7.1$, $R_m/R_s = 12.0$
Angle of deflection = ±50 degrees.

EMBODIMENT 24

| $R_m$ | $R_s$ | $S_0$ | $L_0$ |
|---|---|---|---|
| −326.446 | −40.3 | 56.284 | 114.256 |
| E = 5 | | | |

Values in conditional formulas
$R_m/S_0 = -5.8$, $R_m/R_s = 8.1$
Angle of deflection = ±50 degrees.

EMBODIMENT 25

| $R_m$ | $R_s$ | $S_0$ | $L_0$ |
|---|---|---|---|
| −489.946 | −180.0 | 18.844 | 171.484 |
| E = 15 | | | |

Values in conditional formulas
$R_m/S_0 = -26.0$, $R_m/R_s = 2.7$
Angle of deflection = ±35 degrees.

EMBODIMENT 26

| $R_m$ | $R_s$ | $S_0$ | $L_0$ |
|---|---|---|---|
| −489.946 | 48.995 | 21.772 | 171.484 |
| E = 15 | | | |

Values in conditional formulas
$R_m/S_0 = -22.5$, $R_m/R_s = -10.0$
Angle of deflection = ±35 degrees.

EMBODIMENT 27

| $R_m$ | $R_s$ | $S_0$ | $L_0$ |
|---|---|---|---|
| −489.946 | −35.818 | 21.772 | 171.484 |
| E = 15 | | | |

Values in conditional formulas
$R_m/S_0 = -22.5$, $R_m/R_s = 13.7$
Angle of deflection = ±35 degrees.

EMBODIMENT 28

| $R_m$ | $R_s$ | $S_0$ | $L_0$ |
|---|---|---|---|
| −489.946 | −16.332 | 21.772 | 171.484 |
| E = 15 | | | |

Values in conditional formulas
$R_m/S_0 = -22.5$, $R_m/R_s = 30.0$
Angle of deflection = ±35 degrees.

EMBODIMENT 29

| $R_m$ | $R_s$ | $S_0$ | $L_0$ |
|---|---|---|---|
| −520.00 | −45.0 | 28.6 | 170.56 |
| E = 75 | | | |

Values in conditional formulas
$R_m/S_0 = -18.2$, $R_m/R_s = 11.6$
Angle of deflection = ±35 degrees.

FIGS. 13 to 31 respectively show field curvatures and fθ characteristics with respect to the Embodiments 11 to 29. In the respective Embodiments 11 to 29, the field curvatures and the fθ characteristics are preferable.

In each of the field curvature diagrams with respect to the above Embodiments, the minus and plus sides of field curvature respectively correspond to an increase and a decrease in field curvature in each of the above-mentioned conditions. This is because the image forming reflecting mirror for a constant speed optical scan constitutes a reflecting system and a reflecting face thereof is located on the plus side of a scanned face so that the minus and plus sides are opposite to those with respect to a normal lens system.

Figure 10:
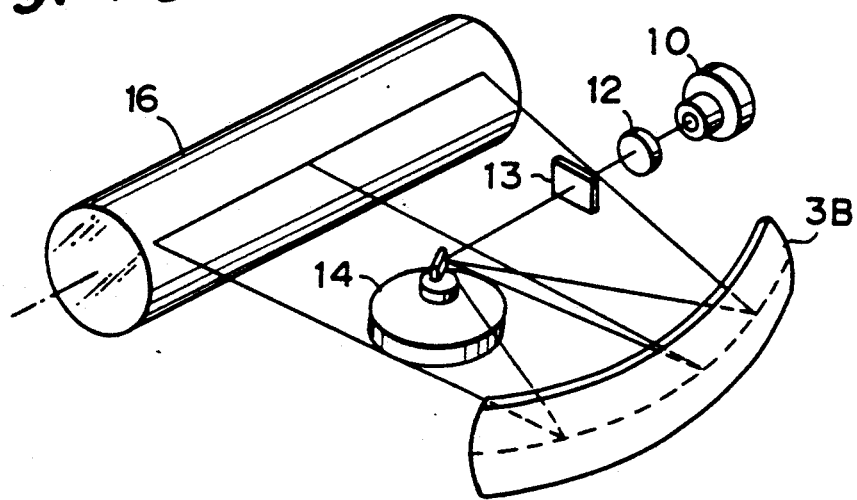
FIG. 10 is a perspective view showing an optical scanner having an eleventh structure in accordance with one embodiment of the present invention.

FIG. 10 schematically shows only a main portion of an optical scanner having an eleventh structure in accordance with one embodiment of the present invention.

In this embodiment, a light source 10 is constructed by a semiconductor laser and emits a divergent light beam. The light source 10 can be constructed by using a LED, etc. The light beam from the light source 10 is changed by a coupling lens 12 to a convergent light beam and is then incident to a cylindrical lens 13 as a linear image forming lens. Thus, a linear image extending in a main scan-corredsponding direction is formed in the vicinity of a deflecting-reflecting face of a light deflector 14.

Figure 12:
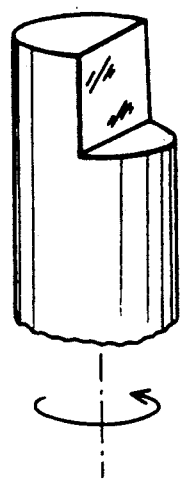
FIG. 12 is a view showing a unifacial rotary mirror which can be used as a light deflector in the optical scanner.
Figures 13A, 13B:
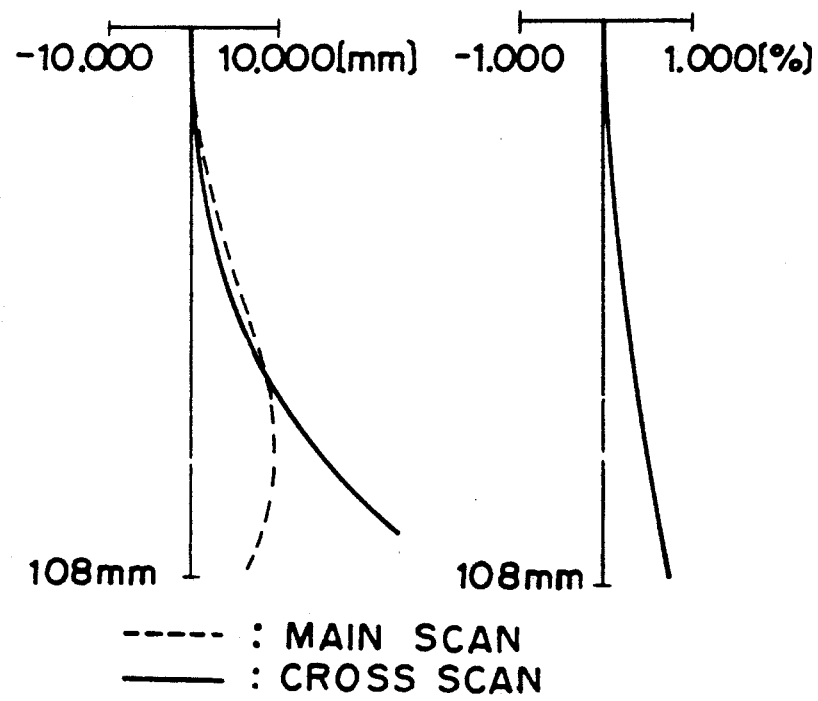
FIGS. 13a and 13b are diagrams respectively showing field curvature and fθ characteristics in Embodiment 11.
Figure 14A:
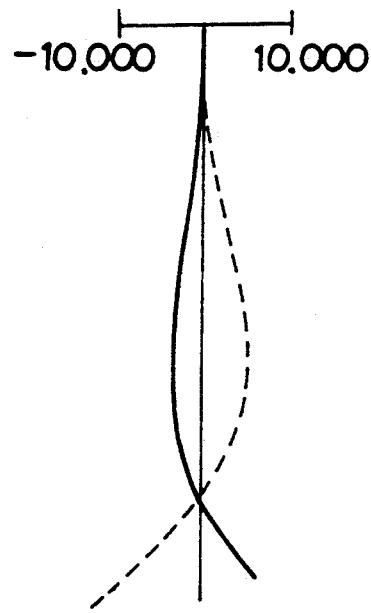
FIGS. 14a and 14b are diagrams respectively showing field curvature and fθ characteristics in Embodiment 12.
Figure 14B:
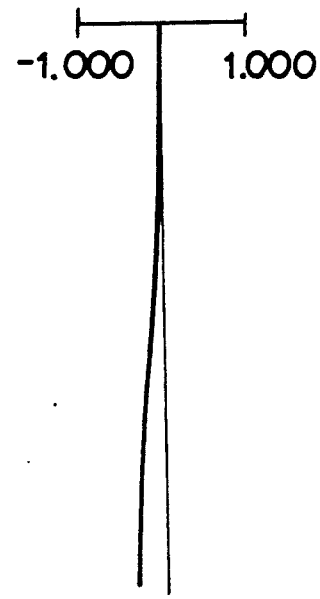
Figure 15A:
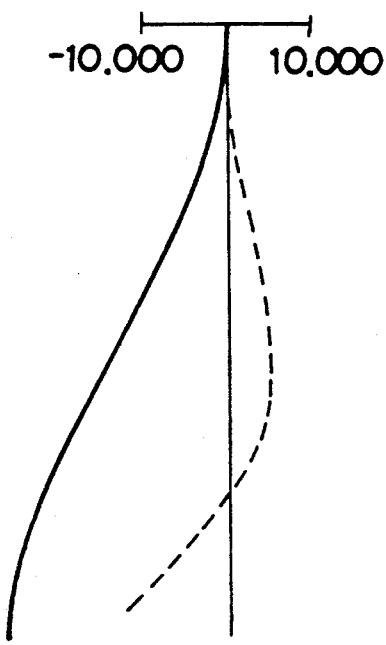
FIGS. 15a and 15b are diagrams respectively showing field curvature and fθ characteristics in Embodiment 13.
Figure 15B:
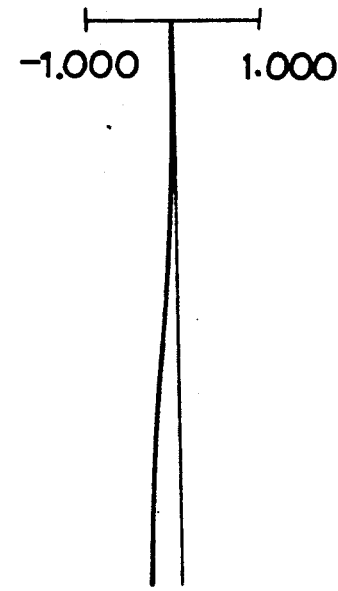
Figure 16A:
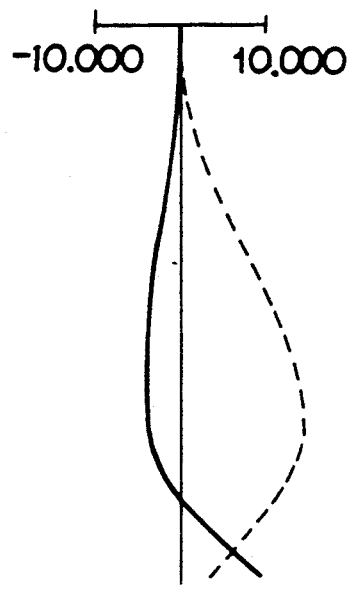
FIGS. 16a and 16b are diagrams respectively showing field curvature and fθ characteristics in Embodiment 14.
Figure 16B:
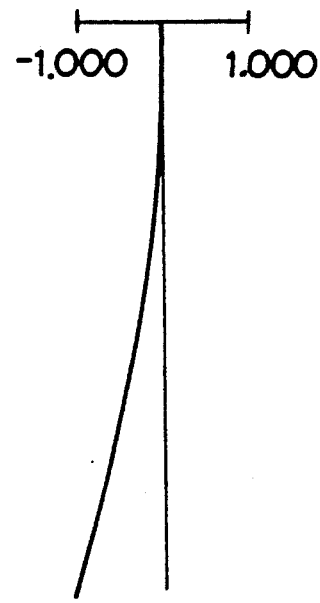
Figure 17A:
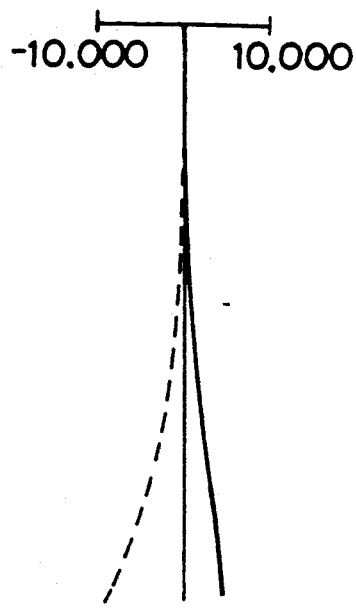
FIGS. 17a and 17b are diagrams respectively showing field curvature and fθ characteristics in Embodiment 15.
Figure 17B:
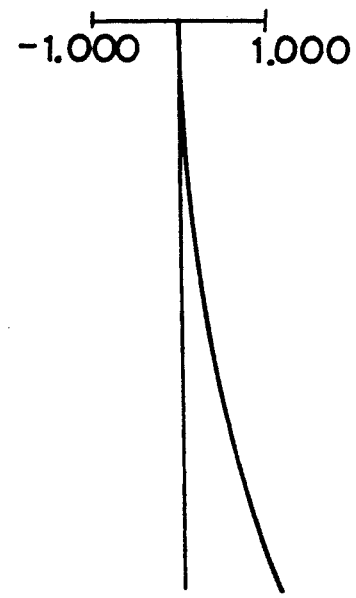
Figure 18A:
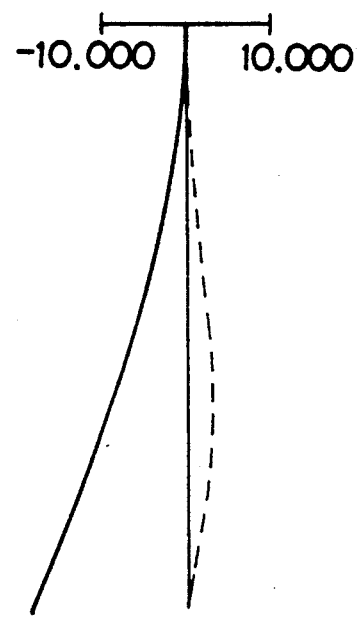
FIGS. 18a and 18b are diagrams respectively showing field curvature and fθ characteristics in Embodiment 16.
Figure 18B:
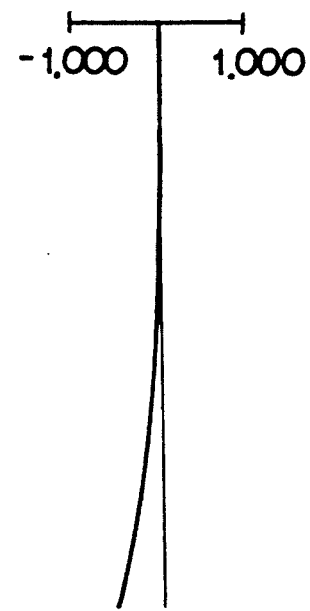
Figure 19A:
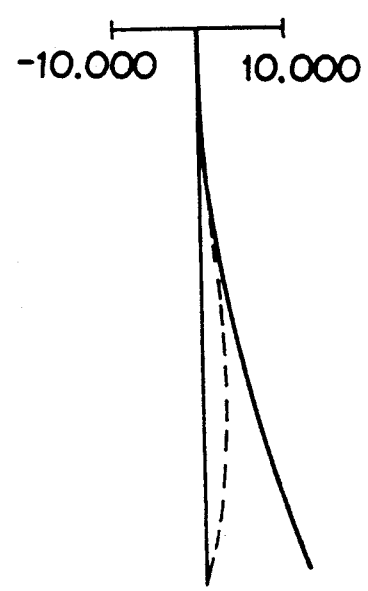
FIGS. 19a and 19b are diagrams respectively showing field curvature and fθ characteristics in Embodiment 17.
Figure 19B:
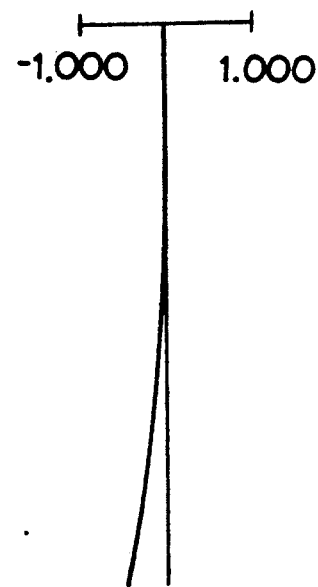
Figure 20A:
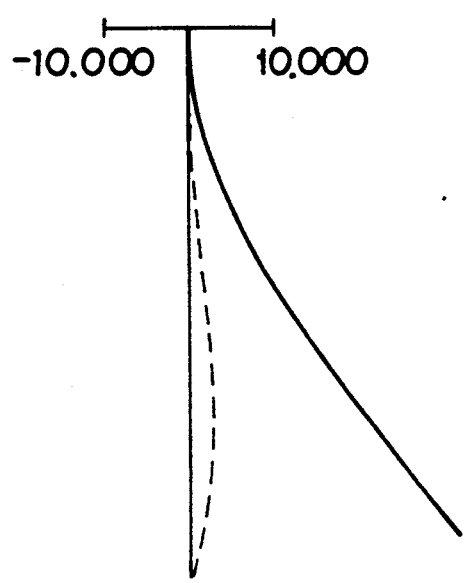
FIGS. 20a and 20b are diagrams respectively showing field curvature and fθ characteristics in Embodiment 18.
Figure 20B:
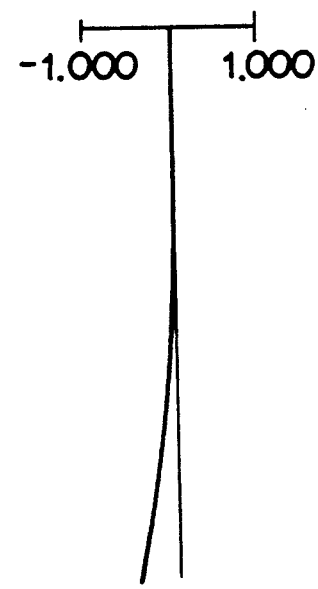
Figure 21A:
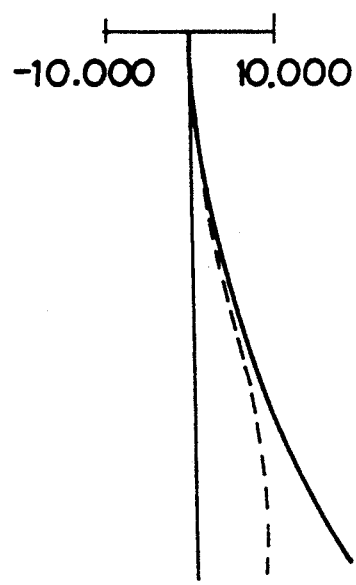
FIGS. 21a and 21b are diagrams respectively showing field curvature and fθ characteristics in Embodiment 19.
Figure 21B:
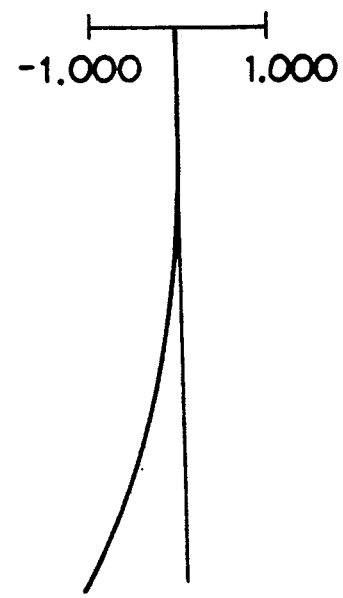
Figure 22A:
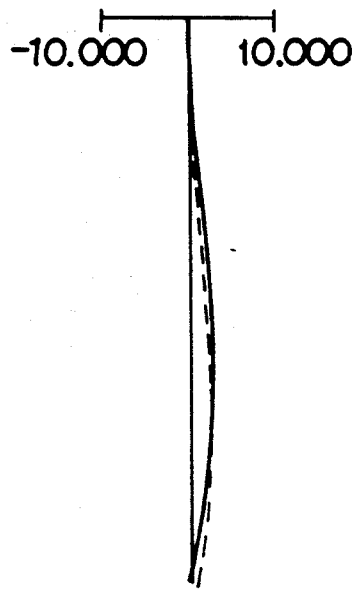
FIGS. 22a and 22b are diagrams respectively showing field curvature and fθ characteristics in Embodiment 20.
Figure 22B:
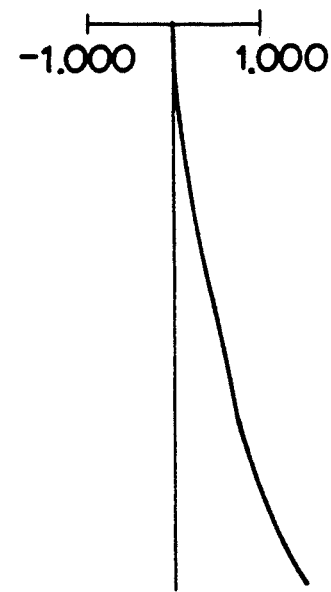
Figure 23A:
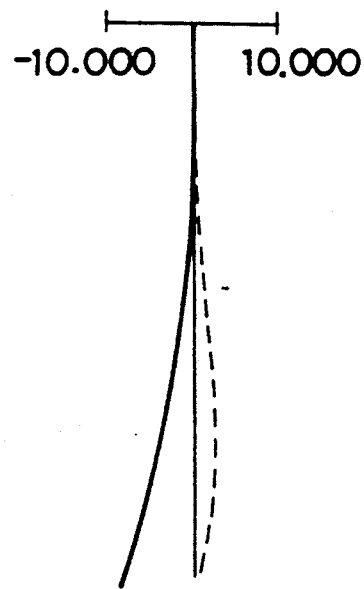
FIGS. 23a and 23b are diagrams respectively showing field curvature and fθ characteristics in Embodiment 21.
Figure 23B:
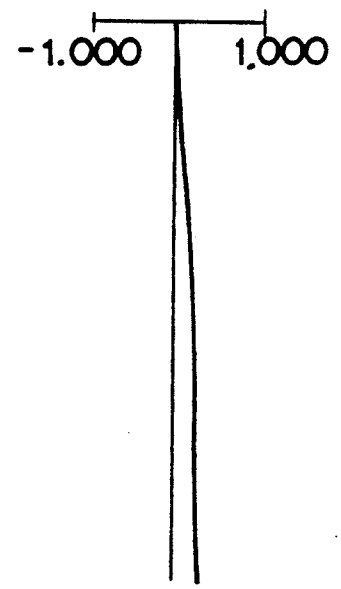
Figure 24A:
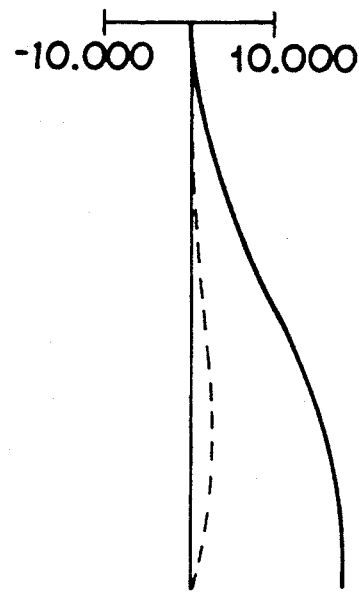
FIGS. 24a and 24b are diagrams respectively showing field curvature and fθ characteristics in Embodiment 22.
Figure 24B:
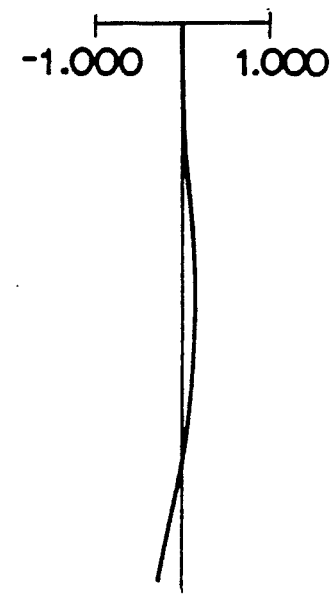
Figure 25A:
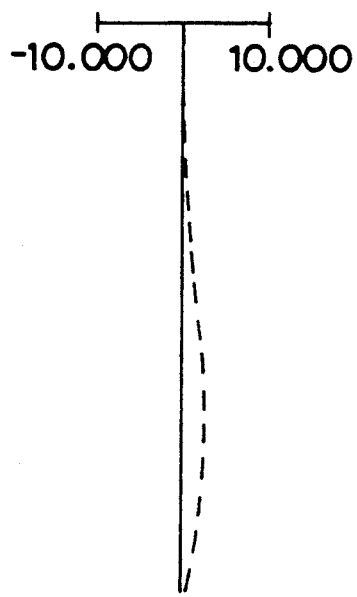
FIGS. 25a and 25b are diagrams respectively showing field curvature and fθ characteristics in Embodiment 23.
Figure 25B:
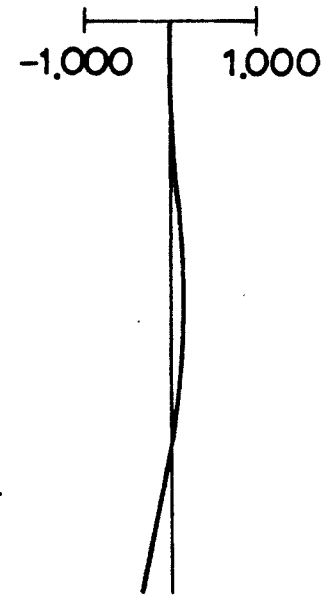
Figure 26A:
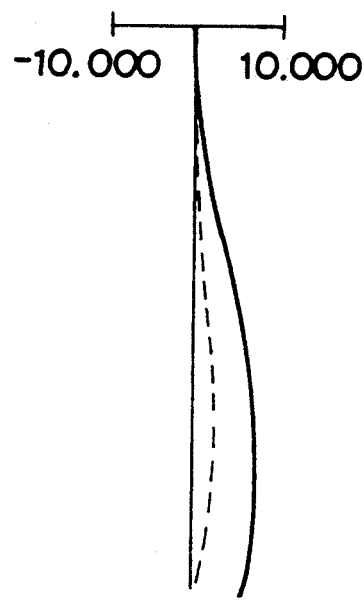
FIGS. 26a and 26b are diagrams respectively showing field curvature and fθ characteristics in Embodiment 24.
Figure 26B:
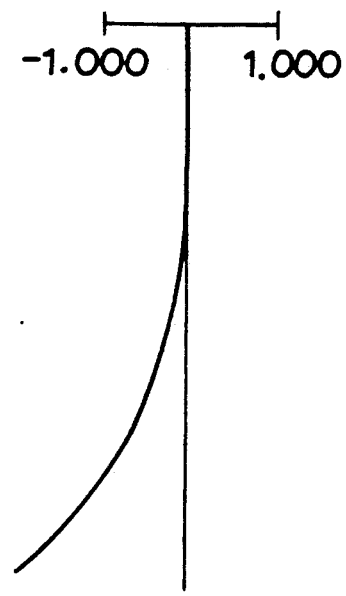
Figure 27A:
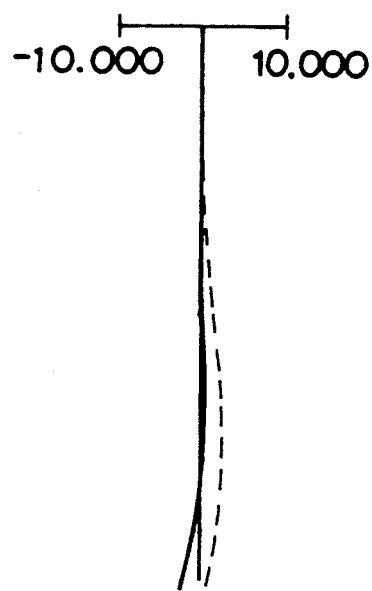
FIGS. 27a and 27b are diagrams respectively showing field curvature and fθ characteristics in Embodiment 25.
Figure 27B:
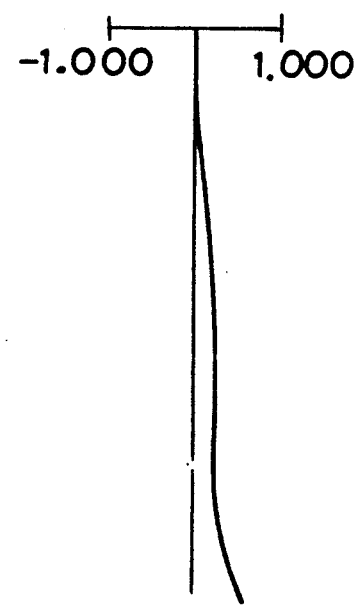
Figure 28A:
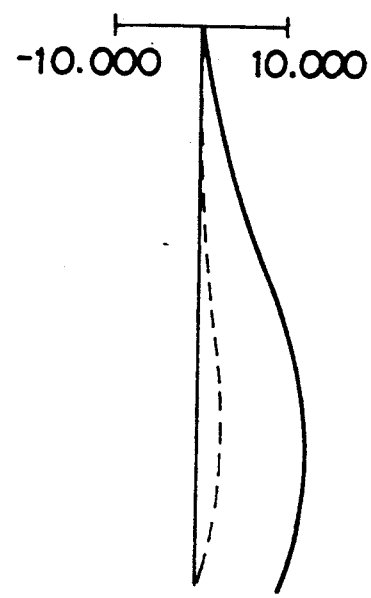
FIGS. 28a and 28b are diagrams respectively showing field curvature and fθ characteristics in Embodiment 26.
Figure 28B:
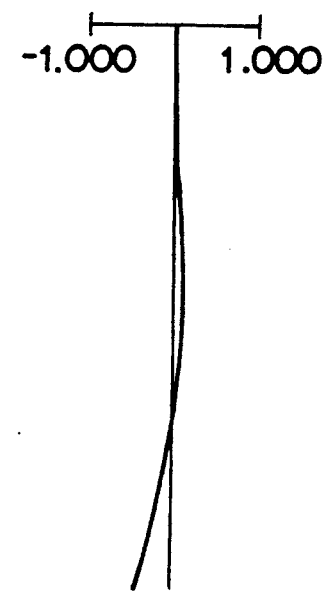
Figure 29A:
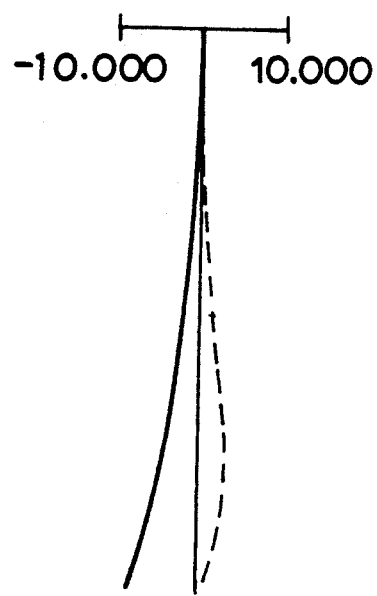
FIGS. 29a and 29b are diagrams respectively showing field curvature and fθ characteristics in Embodiment 27.
Figure 29B:
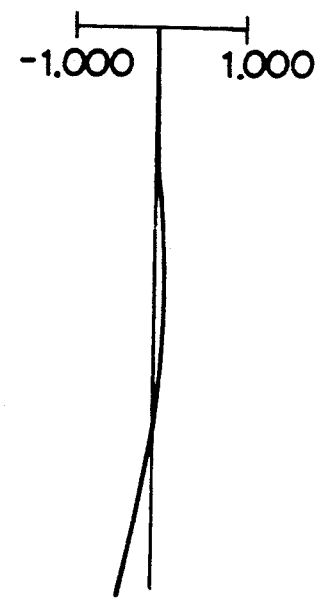
Figure 30A:
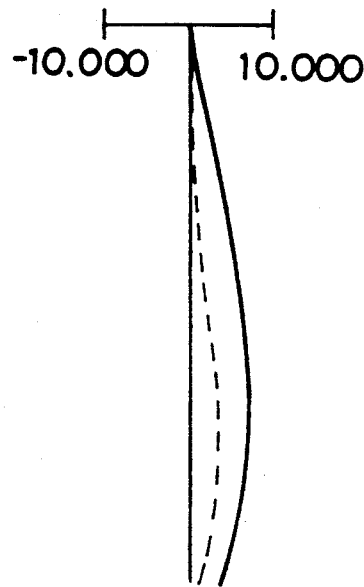
FIGS. 30a and 30b are diagrams respectively showing field curvature and fθ characteristics in Embodiment 28.
Figure 30B:
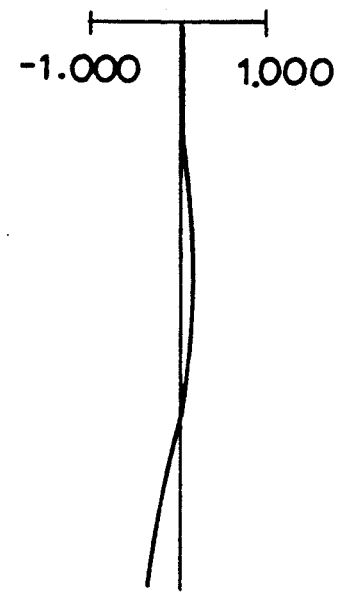
Figure 31A:
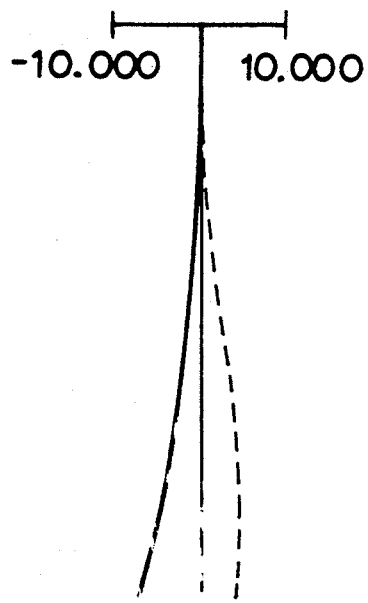
FIGS. 31a and 31b are diagrams respectively showing field curvature and fθ characteristics in Embodiment 29.
Figure 31B:
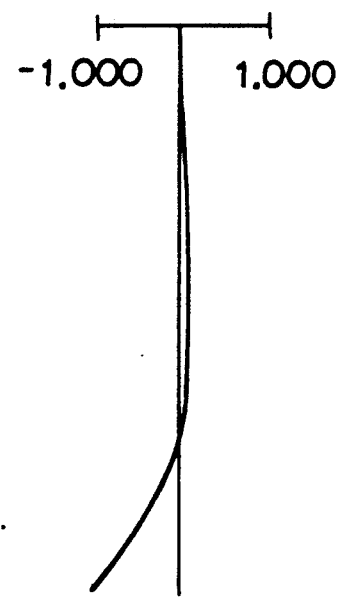

The light deflector 14 reflects and deflects an incident light beam at an equal angular velocity. In this embodiment, the light deflector 14 is constructed by a rotary mirror having two mirror faces. However, it is possible to suitably use a known mirror such as a rotary polygon mirror, a pyramidal mirror, or a unifacial rotary mirror shown in FIG. 12 as the light deflector 14 instead of the rotary mirror having two mirror faces.

The light beam deflected by the light deflector 14 at the equal angular velocity is incident to an image forming reflecting mirror 3B for a constant speed optical scan and is then reflected on this reflecting mirror 3B. The reflected light beam is converged as a light spot on a photoconductive-photosensitive body 16 arranged such that a generating line of the photoconductive-photosensitive body 16 is in conformity with a scanned face. Thus, the photoconductive-photosensitive body 16 is optically scanned by the light spot.

Figure 11A:
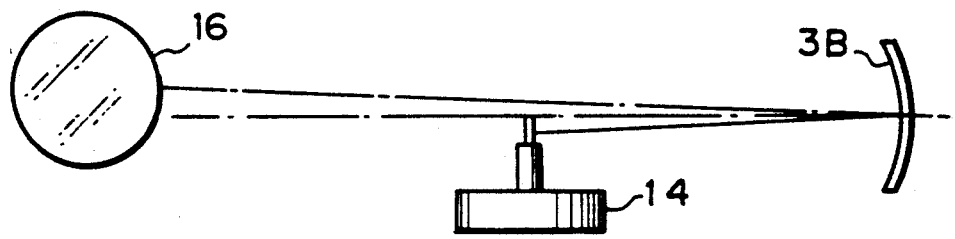
FIGS. 11a to 11c are views showing three constructional examples of an optical path for guiding a deflected light beam onto a scanned face in the optical scanner of the present invention.
Figure 11B:
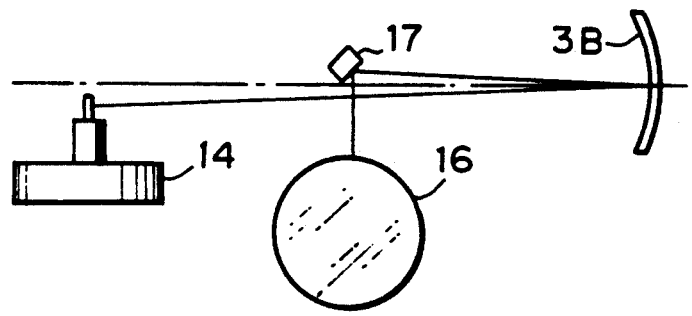
Figure 11C:
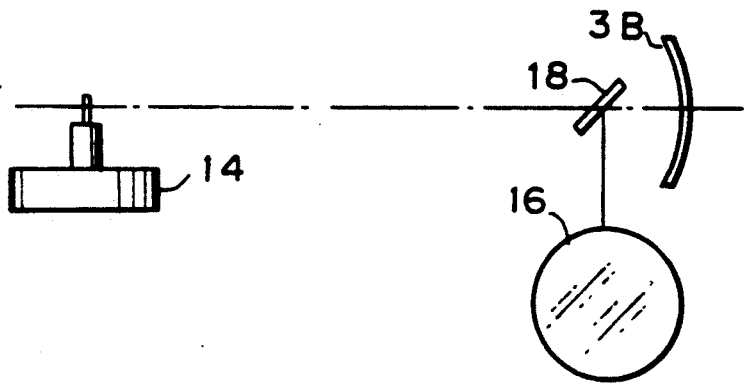

In the embodiment shown in FIG. 10, the deflected light beam from the light deflector 14 is reflected on the image forming reflecting mirror 3B for a constant speed optical scan as shown in FIG. 11a. Thereafter, this reflected light beam is directly transmitted toward the photosensitive body 16. However, as shown in FIG. 11b, the reflected light beam may be guided to the photosensitive body 16 by bending an optical path thereof by a reflecting mirror 17. Further, as shown in FIG. 11c, a deflected light beam may be incident to the image forming reflecting mirror 3B for a constant speed optical scan through a semitransparent mirror 18. In this case, a light beam reflected on the reflecting mirror 3B is again reflected on the semitransparent mirror 18 and is guided to a photosensitive body 16. It is possible to construct various kinds of optical paths for guiding the deflected light beam onto the scanned face except for the above light guiding structures.

In the example shown in FIG. 11a, a light beam splitting means is constructed by inclining a reflecting face of the reflecting mirror 3B with respect to an optical axis. In the example shown in FIG. 11b, the light beam splitting means is constructed by the inclination of a reflecting face and the reflecting mirror 17. In the example shown in FIG. 11c, the light beam splitting means is constructed by the semitransparent mirror 18.

As mentioned above, in accordance with the present invention, it is possible to provide a novel image forming reflecting mirror for a constant speed optical scan and an optical scanner using this image forming reflecting mirror. A convergent light beam is incident onto the image forming reflecting mirror and is reflected on this image forming reflecting mirror to further converge the convergent light beam. Accordingly, it is possible to reduce the length of an optical path of a deflected light beam so that the optical scanner can be made compact. Further, field curvature and the linearity of an image can be preferably corrected since an aspherical face is used.

An image forming reflecting mirror for a constant speed optical scan having each of sixth, eighth, ninth and tenth structures of the present invention also has a function for correcting the inclination of a deflecting-reflecting face. Accordingly, a rotary polygon mirror can be used as a light deflector.

The optical scanner in the present invention can be made compact since the above image forming reflecting mirror for a constant speed optical scan is used. Further, field curvature and the linearity of an image can be preferably corrected so that an optical scanning operation can be preferably performed.

An image forming reflecting mirror for a constant speed optical scan having each of first and second structures of the present invention has a coaxial aspherical face. Therefore, no radii of curvature of the image forming reflecting mirror with respect to light beams in main and cross scanning directions are strictly equal to each other when a field angle is large. Accordingly, astigmatism is caused when a field angle is large. However, an astigmatic amount can be substantially reduced to a negligible amount by optimizing the numeric values of an axial radius of curvature and aspherical coefficients of higher orders.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image forming reflecting mirror for a constant speed optical scan in which a convergent light beam is deflected at an equal angular velocity and is further converged to form a light spot on a scanned face so as to optically scan the scanned face at a constant speed,
said image forming reflecting mirror comprising an aspherical concave reflecting face of a hyperboloidal type having a function for correcting field curvature and linearity;
the aspherical concave reflecting face having a conical constant K satisfying $K < -1$ and an aspherical coefficient $A_4$ of a fourth order satisfying $A_4 \neq 0$.

2. An image forming reflecting mirror for a constant speed optical scan as claimed in claim 1, wherein a distance S from a starting point of deflection of the convergent light beam deflected at the equal angular velocity to a natural convergent point of the convergent light beam, a radius R of curvature of the reflecting face on an optical axis, the conical constant K, and the aspherical coefficient $A_4$ of the fourth order satisfy the following conditions, $$-2.0 < R/S < -1.0$$

$$-1.0/10^8 < A_4/K < 1.0/10^8.$$

3. An optical scanner comprising:
a light source;
a condenser lens for converging a light beam emitted from the light source;
a light deflector for deflecting a convergent light beam from the condenser lens at an equal angular velocity;
a concave mirror for reflecting a deflected light beam from the light deflector to form a light spot on a scanned face; and
light beam splitting means for separating a light beam reflected on the concave mirror from an incident optical path from said light source to the concave mirror;
said concave mirror comprising an image forming reflecting mirror constructed such that the convergent light beam is deflected at the equal angular velocity and is further converged to form the light spot on the scanned face so as to optically scan the scanned face at a constant speed, said image forming reflecting mirror comprising an aspherical concave reflecting face of a hyperboloidal type having a function for correcting field curvature and linearity, the aspherical concave reflecting face having a conical constant K satisfying $K < -1$ and an aspherical coefficient $A_4$ of a fourth order satisfying $A_4 \neq 0$.

4. An optical scanner as claimed in claim 3, wherein a distance S from a starting point of deflection of the convergent light beam deflected at the equal angular velocity to a natural convergent point of the convergent light beam, a radius R of curvature of the reflecting face on an optical axis, the conical constant K, and the aspherical coefficient $A_4$ of the fourth order satisfy the following conditions, $$-2.0 < R/S < -1.0$$

$$-1.0/10^8 < A_4/K < 1.0/10^8.$$

5. An optical scanner as claimed in claim 3, wherein the light deflector is constructed by a tenon type mirror having one or two mirror faces.

6. An optical scanner as claimed in claim 3, wherein the light deflector is constructed by a pyramidal mirror.

7. An image forming reflecting mirror for a constant speed optical scan in which a light beam is convergent in a main scan-corresponding direction and is divergent in a cross scan-corresponding direction with a point near a starting point of deflection as a starting point of the light beam, and the light beam is deflected at an equal angular velocity and is converged to form a light spot on a scanned face so as to optically scan the scanned face at a constant speed;

the image forming reflecting mirror having a shape on a deflecting-reflecting face represented by the following general formula, $$X = Y^2/\{R_m + \sqrt{[R_m^2 - (1+K)Y^2]}\} + A_2 Y^2 + A_3 Y^3 + A_4 Y^4 + \ldots$$

where X designates a coordinate in the direction of an optical axis and Y designates a coordinate in a direction perpendicular to the optical axis with a position on the optical axis as an origin, and $R_m$ designates a radius of curvature on the optical axis, K a conical constant, $A_2$, $A_3$, $A_4$, - - - aspherical coefficients, and symbol $\sqrt{[\ ]}$ designates a square root of a value within bracket [ ];

the image forming reflecting mirror having a concave aspherical toroidal mirror face in the cross scan-corresponding direction which is separated by a distance $R_s$ from a mirror face on the optical axis and is formed by rotating said shape with an axis perpendicular to the optical axis on the deflecting-reflecting face as a rotational axis; and a distance S on a deflecting scanning face between a natural convergent point of said deflected light beam in the main scan-corresponding direction and the starting point of deflection, and said values $R_m$, K and $A_4$ satisfying the following conditions, $$-1.7 \cdot 10^5 < S \cdot R_m < -0.7 \cdot 10^5$$

$$-8.0/10^9 < A_4/K < 8.0/10^9$$

$$-0.4 < R_s/S < -0.3$$

8. An optical scanner comprising:

a light source;

a condenser lens for converging a light beam emitted from the light source;

a linear image forming lens for focusing and forming a convergent light beam from the condenser lens as a linear image extending in a main scan-corresponding direction;

a light deflector having a deflecting-reflecting face in the vicinity of a forming position of said linear image and deflecting a light beam from a side of the linear image forming lens at an equal angular velocity;

a concave mirror for reflecting a deflected light beam from the light deflector to form a light spot on a scanned face; and light beam splitting means for separating a light beam reflected on the concave mirror from an incident optical path from said light source to the concave mirror;

said concave mirror comprising an image forming reflecting mirror constructed such that a light beam is convergent in the main scan-corresponding direction and is divergent in a cross scan-corresponding direction with a point near a starting point of deflection as a starting point of the light beam, and the light beam is deflected at the equal angular velocity and is converged to form the light spot on the scanned face so as to optically scan the scanned face at a constant speed, the image forming reflecting mirror having a shape on the deflecting-reflecting face represented by the following general formula, $$X = Y^2/\{R_m + \sqrt{[R_m^2 - (1+K)Y^2]}\} + A_2 Y^2 + A_3 Y^3 + A_4 Y^4 + \ldots$$

where X designates a coordinate in the direction of an optical axis and Y designates a coordinate in a direction perpendicular to the optical axis with a position on the optical axis as an origin, and $R_m$ designates a radius of curvature on the optical axis, K a conical constant, $A_2$, $A_3$, $A_4$, . . . aspherical coefficients, and symbol $\sqrt{[\ ]}$ designates square root of a value within the bracket [ ];

the image forming reflecting mirror having a concave aspherical toroidal mirror face in the cross scan-corresponding direction which is separated by a distance $R_s$ from a mirror face on the optical axis and is formed by rotating said shape with an axis perpendicular to the optical axis on the deflecting-reflecting face as a rotational axis; and a distance S on a deflecting scanning face between a natural convergent point of said deflected light beam in the main scan-corresponding direction and the starting point of deflection, and said values $R_m$, K and $A_4$ satisfying the following conditions, $$-1.7 \cdot 10^5 < S \cdot R_m < -0.7 \cdot 10^5$$

$$-8.0/10^9 < A_4/K < 8.0/10^9$$

$$-0.4 < R_s/S < -0.3.$$

9. An image forming reflecting mirror for a constant speed optical scan in which a light beam is divergent in a cross scan-corresponding direction with a point near a starting point of deflection as a starting point of the light beam, and the light beam is deflected at an equal angular velocity and is converged to form a light spot on a scanned face so as to optically scan the scanned face at a constant speed;

the image forming reflecting mirror having a shape on a deflecting-reflecting face represented by the following general formula, $$Y^2 = 2R_m X - (K+1)X^2$$

where X designates a coordinate in the direction of an optical axis and Y designates a coordinate in a direction perpendicular to the optical axis with a position on the optical axis as an origin, and $R_m$ designates a radius of curvature on the optical axis and K designates a conical constant;

the image forming reflecting mirror having a concave mirror face of a barrel or saddle type in the cross scan-corresponding direction which is separated by a distance $R_s$ from a mirror face on the optical axis and is formed by rotating said shape with an axis perpendicular to the optical axis on the deflecting-reflecting face as a rotational axis; and a new conical constant $E = K+1$ satisfying the following condition, $$-2 \leq E \leq 15.$$

10. An image forming reflecting mirror for a constant speed optical scan as claimed in claim 9, wherein a distance $S_0$ between a natural convergent point of the deflected light beam at an angle 0 of deflection in the main scan-corresponding direction and a face of the image forming reflecting mirror for a constant speed optical scan, and the conical constant E satisfy the following conditions, when $-2 \leq E \leq 0$, $$-0.65E - 0.4 \leq R_m/S_0 \leq -0.65E + 0.32$$

when $0 \leq E \leq 15$, $$-1.72E - 0.4 \leq R_m/S_0 \leq -1.22E + 0.32.$$

11. An image forming reflecting mirror for a constant speed optical scan as claimed in claim 9 or 10, wherein the radius $R_m$ of curvature, the distance $R_s$ and the conical constant E satisfy the following conditions, when $-2 \leq E \leq 0$, $$0.3E + 1.9 \leq R_m/R_s \leq 0.45E + 3.1$$

when $0 \leq E \leq 15$, $$-0.8E + 1.9 \leq R_m/R_s \leq 1.79E + 3.1.$$

12. An optical scanner comprising:
a light source;
a coupling lens for coupling a light beam emitted from the light source;
a linear image forming lens for focusing and forming a convergent light beam from the coupling lens as a linear image extending in a main scan-corresponding direction;
a light deflector having a deflecting-reflecting face in the vicinity of a forming position of said linear image and deflecting a light beam from a side of the linear image forming lens at an equal angular velocity;
a concave mirror for reflecting a deflected light beam from the light deflector to form a light spot on a scanned face; and
light beam splitting means for separating a light beam reflected on the concave mirror from an incident optical path from said light source to the concave mirror;
said concave mirror being constructed by an image forming reflecting mirror for a constant speed optical scan;
the image forming reflecting mirror being constructed such that a light beam is convergent in the main scan-corresponding direction and is divergent in a cross scan-corresponding direction with a point near a starting point of deflection as a starting point of the light beam, and the light beam is deflected at an equal angular velocity and is converged to form a light spot on the scanned face so as to optically scan the scanned face at a constant speed;

the image forming reflecting mirror having a shape on the deflecting-reflecting face represented by the following general formula, $$Y^2 = 2R_m X - (K+1)X^2$$

where X designates a coordinate in the direction of an optical axis and Y designates a coordinate in a direction perpendicular to the optical axis with a position on the optical axis as an origin, and $R_m$ designates a radius of curvature on the optical axis and K designates a conical constant;

the image forming reflecting mirror having a concave mirror face of a barrel or saddle type in the cross scan-corresponding direction which is separated by a distance $R_s$ from a mirror face on the optical axis and is formed by rotating said shape with an axis perpendicular to the optical axis on the deflecting-reflecting face as a rotational axis; and a new conical constant $E = K+1$ satisfying the following condition, $$-2 \leq E \leq 15.$$

13. An optical scanner as claimed in claim 12, wherein a distance $S_0$ between a natural convergent point of the deflected light beam at an angle 0 of deflection in the main scan-corresponding direction and a face of the image forming reflecting mirror for a constant speed optical scan, and the conical constant E satisfy the following conditions, when $-2 \leq E \leq 0$, $$-0.65E - 0.4 \leq R_m/S_0 \leq -0.65E + 0.32$$

when $0 \leq E \leq 15$, $$-1.72E - 0.4 \leq R_m/S_0 = -1.22E + 0.32.$$

14. An optical scanner as claimed in claim 12 or 13, wherein the radius $R_m$ of curvature, the distance $R_s$ and the conical constant E satisfy the following conditions, when $-2 \leq E \leq 0$, $$0.3E + 1.9 \leq R_m/R_s \leq 0.4E + 3.1$$

when $0 \leq E \leq 15$, $$-0.8E + 1.9 \leq R_m/R_2 \leq 1.79E + 3.1.$$

* * * * *